(12) United States Patent
Ma et al.

(10) Patent No.: US 10,962,676 B2
(45) Date of Patent: Mar. 30, 2021

(54) SIGNAL PROCESSING OF A MULTI-SUB ROTATIONAL RESISTIVITY LOGGING TOOL

(71) Applicant: Halliburton Energy Services, Inc., Houston, TX (US)

(72) Inventors: Jin Ma, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 37 days.

(21) Appl. No.: 16/482,616

(22) PCT Filed: Jun. 2, 2017

(86) PCT No.: PCT/US2017/035765
§ 371 (c)(1),
(2) Date: Jul. 31, 2019

(87) PCT Pub. No.: WO2018/222208
PCT Pub. Date: Dec. 6, 2018

(65) Prior Publication Data
US 2020/0003930 A1 Jan. 2, 2020

(51) Int. Cl.
*G01V 3/38* (2006.01)
*G01V 3/20* (2006.01)

(52) U.S. Cl.
CPC . *G01V 3/38* (2013.01); *G01V 3/20* (2013.01)

(58) Field of Classification Search
CPC ... G01V 3/38; G01V 3/20; G01V 3/30; G01V 3/28; G01V 3/26; G01V 3/34

(Continued)

(56) References Cited

U.S. PATENT DOCUMENTS

| 5,790,191 A * | 8/1998 | Zhang | H04N 5/3658 |
| | | | 348/300 |
| 8,427,558 B2 * | 4/2013 | Inui | H01L 27/14643 |
| | | | 348/241 |

(Continued)

FOREIGN PATENT DOCUMENTS

| WO | 2009151822 A1 | 12/2009 |
| WO | 2017058690 A1 | 4/2017 |
| WO | 2018034927 A1 | 2/2018 |

OTHER PUBLICATIONS

PCT Application Serial No. PCT/US2017/035765, International Search Report, dated Feb. 26, 2018, 3 pages.

(Continued)

*Primary Examiner* — Giovanni Astacio-Oquendo
(74) *Attorney, Agent, or Firm* — Gilliam IP PLLC

(57) ABSTRACT

A method comprising determining a resistivity of a formation, based on a detection of angular electromagnetic signals by a receiver antenna on a first sub of a multi-sub resistivity tool during rotational operation in a wellbore within the formation, the angular electromagnetic signals emitted into the formation, prior to the detection, by a transmitter antenna on a second sub of the multi-sub resistivity tool, wherein the first sub and the second sub are separated apart such that the angular electromagnetic signals are to be transmitted deep into the formation, wherein determining the resistivity comprises curve-fitting and reproducing angular electromagnetic signals by the receiver antenna, and decoupling component signals based on fitting coefficients derived from the angular electromagnetic signals.

20 Claims, 12 Drawing Sheets

(58) Field of Classification Search
USPC .................................. 324/338, 334, 332, 323
See application file for complete search history.

(56) References Cited

U.S. PATENT DOCUMENTS

| | | | |
|---|---|---|---|
| 8,462,240 B2* | 6/2013 | Osawa | H04N 5/341 |
| | | | 348/294 |
| 2008/0136419 A1 | 6/2008 | Seydoux et al. | |
| 2012/0166086 A1 | 6/2012 | Zhong et al. | |
| 2012/0283952 A1 | 11/2012 | Tang et al. | |
| 2015/0330190 A1 | 11/2015 | Wu et al. | |
| 2016/0116624 A1 | 4/2016 | Omeragic | |
| 2016/0195634 A1 | 7/2016 | Frey | |
| 2017/0235011 A1* | 8/2017 | Wu | G01V 3/38 |
| | | | 702/7 |
| 2018/0088191 A1* | 3/2018 | Ewe | E21B 47/135 |
| 2018/0348396 A1* | 12/2018 | Hou | G01V 3/34 |

OTHER PUBLICATIONS

PCT Application Serial No. PCT/US2017/035765, International Written Opinion, dated Feb. 26, 2018, 4 pages.
United Kingdom Application Serial No. 1805728.1; Combined Search and Examination Report Under Sections 17& 18(3); dated Sep. 7, 2018, 7 pages.

* cited by examiner

US 10,962,676 B2

SIGNAL PROCESSING OF A MULTI-SUB ROTATIONAL RESISTIVITY LOGGING TOOL

BACKGROUND

The disclosure generally relates to the field of well logging operations, and more particularly signal processing of a multi-sub rotational resistivity logging tool.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

As wells are established, it is often useful to obtain information about the well and the geological formations through which the well passes. Information gathering may be performed using tools that are coupled with or integrated into the drill string. The process of "measurement while drilling (MWD)" uses measurement tools to determine formation and wellbore temperatures and pressures, as well as the trajectory of the drill bit.

In some instances, the process of "logging while drilling (LWD)" includes using imaging tools to form an image of the wellbore and the geological formation surrounding the wellbore to determine additional formation properties such as permeability, porosity, resistivity, and other properties. The information obtained by MWD and LWD allows operators to make real-time decisions and changes to ongoing drilling operations.

BRIEF DESCRIPTION OF THE DRAWINGS

Examples of the disclosure can be better understood by referencing the accompanying drawings.

DESCRIPTION

Figure 1:
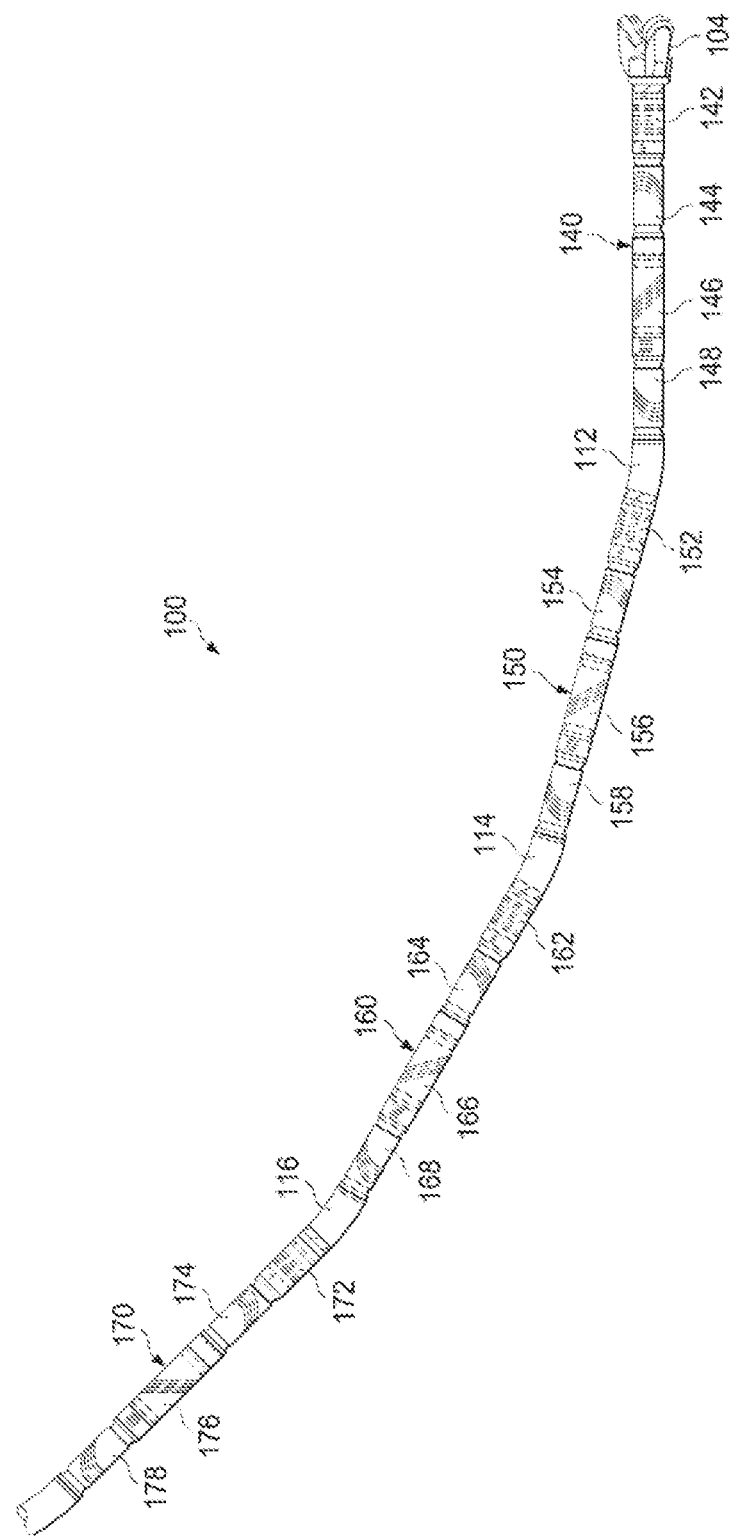
FIG. 1 depicts a multi-sub resistivity tool, according to some embodiments.

The description that follows includes example systems, apparatuses, and methods that embody aspects of the disclosure. However, it is understood that this disclosure may be practiced without these specific details. For instance, this disclosure provides for example types of antennas (e.g., coaxial loop (coil) antennas) used in determining resistivity in illustrative examples. Aspects of this disclosure can be also applied to other types of antennas. In other instances, well-known instruction instances, structures and techniques have not been shown in detail in order not to obfuscate the description.

Various embodiments include signal processing of data detected during MWD or LWD operations by a multi-sub rotational resistivity tool (hereinafter the multi-sub resistivity tool) that is part of a drill string. The multi-sub resistivity tool can include multiple modularized subs. In some embodiments, transmitter and receiver antennas are located on separate modularized subs. Each sub can include one or more antennas. For instance, a sub can include a multi-turn coaxial loop (coil) antenna and a number of multi-turn tilted loop (coil) antennas. The separate modularized subs can be interchangeable as transmitter or receivers subs.

In some embodiments, the multi-sub resistivity tool can include different subs along the Bottom Hole Assembly (BHA). For example, the multi-sub resistivity tool can include a sub nearest the drill bit that has one or more transmitter antennas. The multi-sub resistivity tool can also include additional subs further up the BHA, wherein each additional sub can include one or more receiver antennas. In some embodiments, the different subs can be rotating such that a tool face offset for two or more of the subs are different relative to each other. For example, the subs can be rotating at different speeds and/or at least partially independent of each other, thereby causing the subs to have different tool face offsets. In this context, a tool face offset of a sub can be defined as a difference in the transmitter azimuthal position and receiver azimuthal position, wherein an azimuthal position is an angle around a sub axis from zero degrees to 360 degrees. For example, an azimuthal position of the transmitter antennas on the transmitter sub can be different from an azimuthal position of receiver antennas on one or more of the receiver subs.

Additionally, drilling of the wellbore can include directional or slant drilling such that at least part of the wellbore is non-vertical. As a result, when the BHA is located at a curved portion of the wellbore during the drilling, a dogleg angle can be changed between the subs. The dogleg angle between a first sub and a second sub can be defined as the angle formed between a line parallel to the longitudinal axis of the first sub and a line parallel to the longitudinal axis of the second sub.

During rotational operation, a transmitter antenna can emit an electromagnetic signal into the subsurface formation surrounding the wellbore. After traversal through the subsurface formation, the electromagnetic signal can be detected by a receiver antenna on a different sub. The detected electromagnetic signal can be processed to determine various formation characteristics (e.g., resistivity). In some embodiments, signal processing of the electromagnetic signal can account for tool face offsets (azimuthal positions for each sub) and the dogleg angle between the sub of the transmitter antenna and the sub of the receiver antenna. The toolface offset and dogleg angles of each sub can each be acquired through the use of sensors on each of the subs. The term "angular electromagnetic signals" can be defined as electromagnetic signals wherein the longitudinal axis of the sub of the receiver antenna is not parallel to the longitudinal axis of the sub of the transmitter antenna.

In some embodiments, increasing the separation between the sub of the transmitter antenna and the sub of the receiver antenna can increase the depth of penetration into the formation for an electromagnetic signal. The sub of the receiver antenna and the sub of the transmitter electromagnetic signal can be separated at a distance to allow deep penetration into the formation, wherein deep penetration can be defined as a penetration depth of 50 feet or greater.

As further described below, some embodiments include resistivity measurements that account for the toolface offset (azimuthal position) and dogleg angles. Thus, some embodiments provide more accurate resistivity measurements of the various downhole formations using the rotational multi-sub resistivity tool described herein. Additionally, in some embodiments, signal processing of the electromagnetic signal account for situations in which the receiver antenna is unable to acquire a minimum number of electromagnetic readings in a rotation by using acquired data to approximate values for the electromagnetic signal at unmeasured azimuthal positions. Such signal processing to approximate can be based on the multi-sub resistivity tool azimuthal measurement pattern (as further described below). Results of the signal processing can provide for a more accurate formation evaluation and can be used for proactive geosteering to allow for increased hydrocarbon recovery from the various downhole formations.

Multi-Sub Resistivity Tool Examples

FIG. 1 depicts a multi-sub resistivity tool, according to some embodiments. In this example, a multi-sub resistivity tool 100 comprises a set of four subs distributed along a curved borehole trajectory. The four subs include a first sub 140, a second sub 150, a third sub 160, and a fourth sub 170. A longitudinal axis of the first sub 140 is approximately horizontal with respect to the x-y plane. A drill bit 104 attaches to the lower end (relative to the bottom of the wellbore) to the first sub 140. A first coaxial coil antenna 142 wraps around the body of the first sub 140 near the lower end. The first sub 140 also includes a first tilted coil antenna 144 positioned adjacent to the first coaxial coil antenna 142. The first sub 140 includes a second tilted coil antenna 146 positioned adjacent to the first tilted coil antenna 144. The first sub 140 also includes a third tilted coil antenna 148 adjacent to the second tilted coil antenna 146. In some embodiments, each of the coil antennas 142-148 is operated as transmitter antenna. In other examples, each of the coil antennas 142-148 can be operated as either receiver or transmitter antenna.

A connecting tubular 112 attaches to the upper end (relative to the top of the wellbore) of the first sub 140. A second sub 150 attaches to the upper end of the connecting tubular 112. The second sub 150 is rotatable with respect to its longitudinal axis, and the longitudinal axis can be at an angle with respect to the longitudinal axis of the first sub 140. A first coaxial coil antenna 152 wraps around the lower-most side of the second sub 150. The second sub 150 also includes a first tilted coil antenna 154 positioned above and adjacent to the first coaxial coil antenna 152. The second sub 150 includes a second tilted coil antenna 156 positioned adjacent to the first tilted coil antenna 154. The second sub 150 also includes a third tilted coil antenna 158 adjacent to the second tilted coil antenna 156. In one example, each of the coil antennas 152-158 is operated as receiver antenna. In other examples, each of the coil antennas 152-158 can be operated as either receiver or transmitter antenna.

A connecting tubular 114 attaches to the upper end (relative to the top of the wellbore) of the second sub 150. A third sub 160 attaches to the upper end of the connecting tubular 114. The third sub 160 is rotatable with respect to its longitudinal axis, and the longitudinal axis can be at an angle with respect to the longitudinal axis of the second sub 150. A first coaxial coil antenna 162 wraps around the lower-most side of the third sub 160. The third sub 160 also includes a first tilted coil antenna 164 positioned above and adjacent to the first coaxial coil antenna 162. The third sub 160 includes a second tilted coil antenna 166 positioned adjacent to the first tilted coil antenna 164. The third sub 160 also includes a third tilted coil antenna 168 adjacent to the second tilted coil antenna 166. In one example, each of the coil antennas 162-168 is operated as receiver antenna. In other examples, each of the coil antennas 162-168 can be operated as either receiver or transmitter antenna.

A connecting tubular 116 attaches to the upper end (relative to the top of the wellbore) of the third sub 160. A fourth sub 170 attaches to the upper end of the connecting tubular 114. The fourth sub 170 is rotatable with respect to its longitudinal axis, and the longitudinal axis can be at an angle with respect to the longitudinal axis of the third sub 170. A first coaxial coil antenna 172 wraps around the lower-most side of the fourth sub 170. The fourth sub 170 also includes a first tilted coil antenna 174 positioned above and adjacent to the first coaxial coil antenna 172. The fourth sub 170 includes a second tilted coil antenna 176 positioned adjacent to the first tilted coil antenna 174. The fourth sub 170 also includes a third tilted coil antenna 178 adjacent to the second tilted coil antenna 176. In one example, each of the coil antennas 172-178 is operated as receiver antenna. In other examples, each of the coil antennas 172-178 can be operated as either receiver or transmitter antenna.

Figure 2:
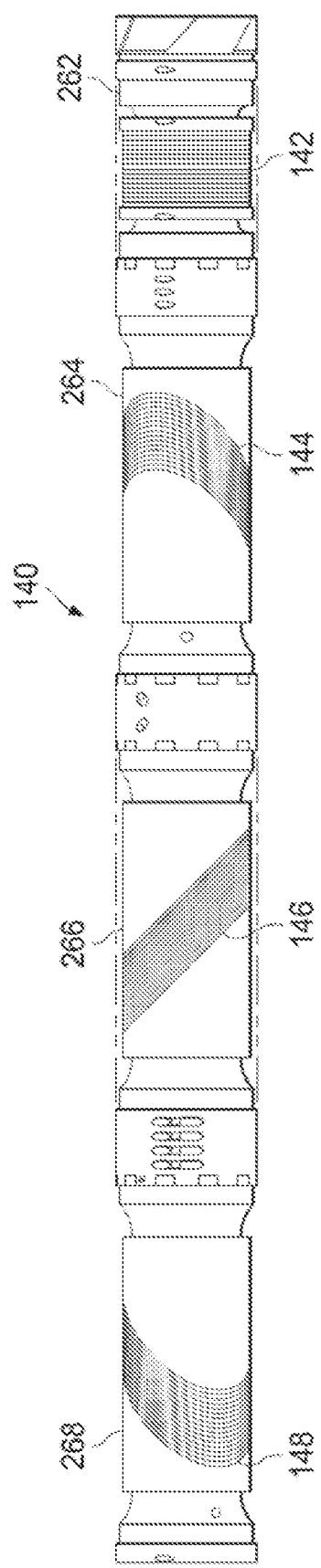
FIG. 2 depicts one sub of the multi-sub resistivity tool, according to some embodiments.

FIG. 2 depicts one sub of the multi-sub resistivity tool, according to some embodiments. In this example, the lower edge of the first sub 140 comprises a first cylindrical body 262 with the first coaxial coil antenna 142 wrapped around the first cylindrical body 262. The first sub 140 also includes a second cylindrical body 264 positioned adjacent to the first cylindrical body 262, and the first tilted coil antenna 144 wraps around the second cylindrical body 264. The first sub 140 also includes a third cylindrical body 266 positioned adjacent to the second cylindrical body 264, and the second tilted coil antenna 146 wraps around the third cylindrical body 266. The first sub 140 also includes a fourth cylindrical body 268 positioned adjacent to the third cylindrical body 266, and the third tilted coil antenna 148 wraps around the fourth cylindrical body 268.

Figure 3:
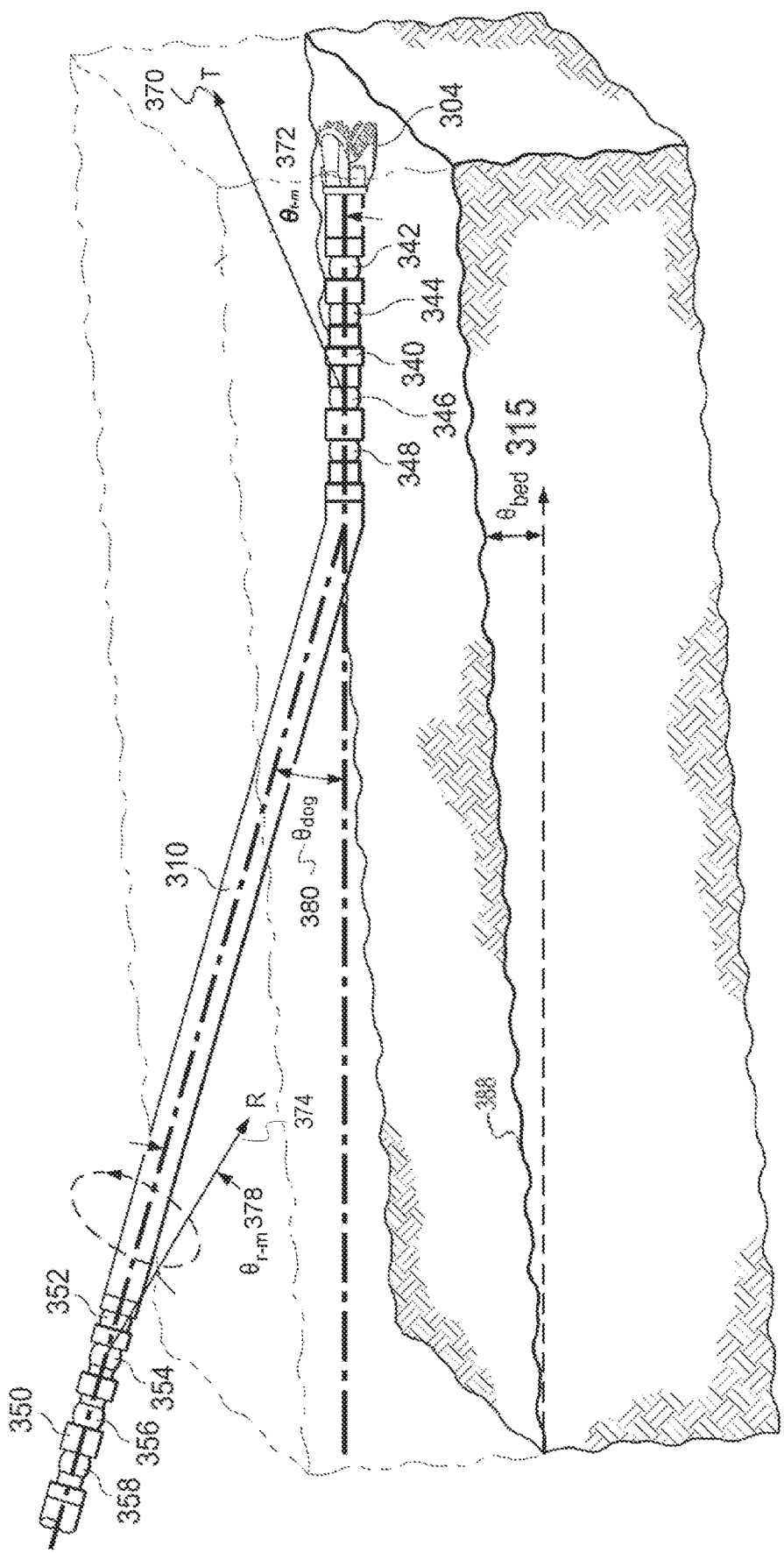
FIG. 3 depicts the rotation of a multi-sub resistivity tool in a formation, according to some embodiments.

FIG. 3 depicts the rotation of a multi-sub resistivity tool in a formation, according to some embodiments. A drill string 390 includes a drill bit 304 positioned at the bottom of the wellbore. A transmitter sub 340 attaches to the drill bit 304. The transmitter sub 340 comprises four coils to be operated as transmitter antennas—a coaxial coil transmitter 342, a first tilted coil transmitter 344, a second tilted coil transmitter 346, and a third tilted coil transmitter 348. In this example, the coaxial coil transmitter 342 is positioned on the transmitter sub 340 nearest the drill bit 304. The first tilted coil transmitter 344 is positioned on the transmitter sub 340 above the coaxial coil transmitter 342. The second tilted coil transmitter 346 is positioned above the first tilted coil transmitter 344. The third tilted coil transmitter 348 is positioned above the second tilted coil transmitter 346. In this example, each of the three tilted coil transmitters 344-348 have mutually non-parallel tilt plane normal vectors. In the case of either a single turn or multiturn coil, a tilt plane can be formed by a plane that is coplanar with any three distinct points along a single turn of the coil. In this example, a tilt plane normal vector T 370 is depicted for the second tilted coil transmitter 346. For each of the tilted coil transmitters, a transmitter tilt angle is formed by their respective tilt plane normal directions and the axis of the transmitter sub 340. In this example, a measured transmitter tilt angle $\theta_{t-m}$ 372 for the second tilted coil transmitter 346 is formed by the tilt plane normal vector T 370 and the axis of the transmitter sub 340.

A connecting tubular 310 is above the transmitter sub 340, wherein the connecting tubular 310 can have a longitudinal axis aligned to be at different angle than the longitudinal axis of the transmitter sub 340. A receiver sub 350 is above the connecting tubular 310. A longitudinal axis of the receiver sub 350 is at a dogleg angle ($\theta_{dog}$) 380 with respect to the longitudinal axis of the transmitter sub 340. In this example, a dogleg angle is defined to be the angle formed by the longitudinal axis of the receiver sub 350 and the longitudinal axis of the transmitter sub 340. In this example, the receiver sub 350 includes four coils to be operated as receiver antennas—a first coaxial receiver 352, a first tilted receiver 354, a second tilted coil receiver 356, and a third tilted coil receiver 358.

The first coaxial receiver 352 wraps around the body of the receiver sub 350 near the lower end and positioned adjacent to connecting tubular 310. The first tilted receiver 354 is positioned adjacent to the first coaxial receiver 352. The second tilted coil receiver 356 is positioned adjacent to the first tilted receiver 354. The third tilted coil receiver 358 is positioned adjacent to the second tilted coil receiver 356. In this example, each of the three tilted coil receivers 354-358 have mutually non-parallel tilt plane normal vectors. The tilt plane normal vector R 374 is depicted for the first tilted receiver 354. Each of the tilted coil receivers has a receiver tilt angle, formed by their respective tilt plane normal directions and the axis of the receiver sub 350. In the case of the second tilted coil transmitter 346, a receiver tilt angle ($\theta_{r-m}$) 378 is formed by the tilt plane normal vector R 374 and the axis of the receiver sub 350. In addition, a horizontal line and the formation boundary plane 388 can form a formation bed angle ($\theta_{bed}$) 315. In this context, a horizontal line is defined as a line that would be perpendicular to a vertical borehole.

During operations, the multi-sub resistivity tool can be rotated about a longitudinal axis as the transmitter antennas are activated. Each of the four transmitters 342-348 can be operated at a same or different frequencies to emit an electromagnetic signal. The coil receivers detect the electromagnetic signal after the signal has traversed the formation around the wellbore. For example, a coil receiver can detect the electromagnetic signal as voltage measurements at selected azimuthal positions as the multi-sub resistivity tool is being rotated. In some embodiments, a coil receiver determines a voltage measurement at each one of the selected azimuthal positions $\beta_i$, wherein i iterates from 1 to N, where N is a non-zero positive integer greater than 3. For example, in the case of N=8 where the set of the azimuthal positions $\beta$ is symmetric, there would be a total of 8 unique values of $\beta$, wherein one set of values for $\beta$ can be $\beta_1$=45 degrees, $\beta_2$=90 degrees, $\beta_3$=135 degrees, $\beta_4$=180 degrees, $\beta_5$=225 degrees, $\beta_6$=270 degrees, $\beta_7$=315 degrees, $\beta_8$=360 degrees. In other examples, N can be equal to 8, 16, 64, 128, or various other positive, nonzero integers. Additionally, in some embodiments, $\beta$ can be arranged asymmetrically.

Figure 4:
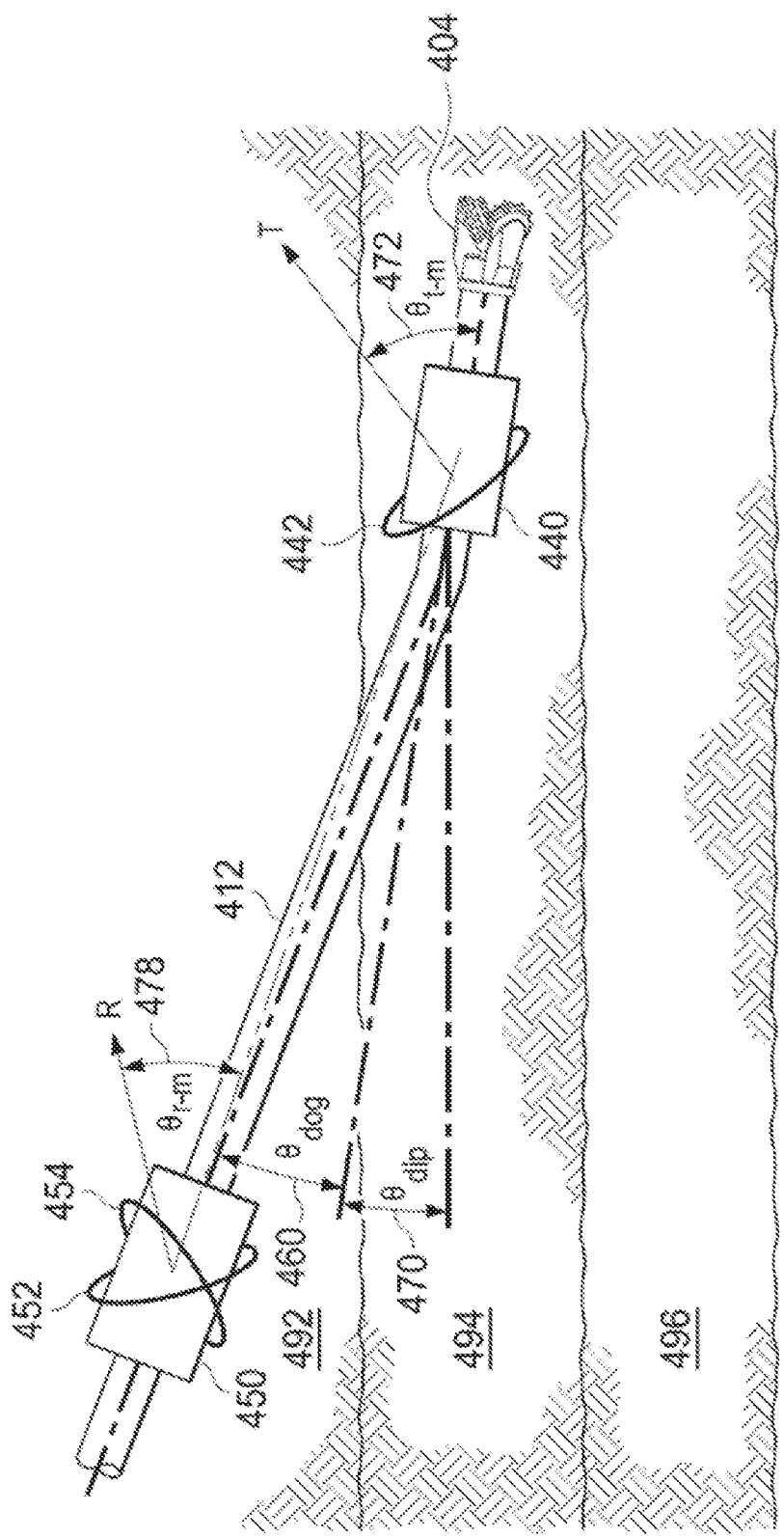
FIG. 4 depicts a visual representation of a one dimensional (1-D) approximation of the multi-sub resistivity tool sub, according to some embodiments.

FIG. 4 depicts a visual representation of a one dimensional (1-D) approximation of the multi-sub resistivity tool sub, according to some embodiments. In this 1-D simplification, it is assumed that subsurface heterogeneity includes only flat layers, wherein each layer is homogeneous within a single layer. In this example, each of the upper layer 492, middle layer 494, and lower layer 496 is homogeneous but can differ in properties between layers. In this example, a drill bit 404 is at the bottom of the tubular system. The transmitter sub 440 is above the drill bit 404. In this example, the transmitter sub 440 comprises the single tilted coil transmitter 442, which has a non-horizontal axis. The connecting tubular 412 attaches to the transmitter sub 440. The receiving sub 450 is above the connecting tubular 412, which can be rotated such that a tilted coil can be rotated from a first tilted receiving coil position 452 into a second tilted receiving coil position 454. In this example, the axis of the receiving sub 450 and the axis of the transmitter sub 440 line form a dogleg angle ($\theta_{dog}$) 460. In this example, the axis of the transmitter sub 440 and a horizontal line forms a transmitter dip angle ($\theta_{dip\text{-}TX}$) 470. In some embodiments, both the transmitter dip angle and the receiver dip angle can be non-zero, wherein a dip angle is defined as an angle of a sub relative to the plane of a geological formation.

Figure 5:
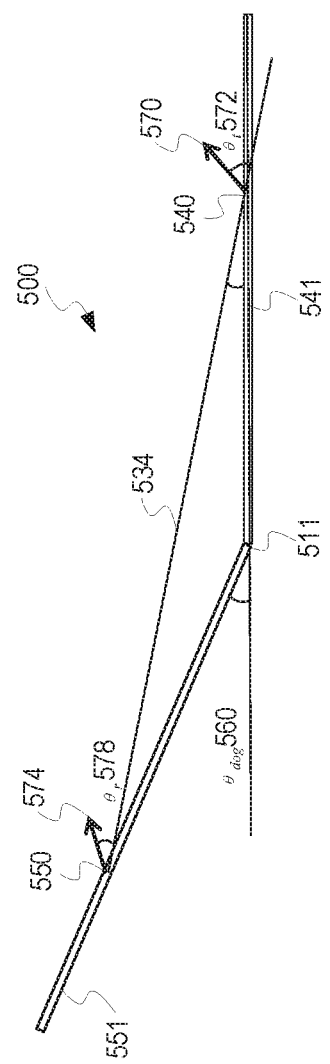
FIG. 5 depicts a simplified visual representation of the angular relationships between two subs of the multi-sub resistivity tool, according to some embodiments.

FIG. 5 depicts a simplified visual representation of the angular relationships between two subs of the multi-sub resistivity tool, according to some embodiments. A representation 500 includes a transmitter centered at a point 540 with a transmitter tilt plane normal vector 570. The transmitter wraps around a transmitter sub having a longitudinal axis 541. A receiver centered at a point 550 is above the transmitter and has a receiver tilt plane normal vector 574. The receiver wraps around a receiver sub having a longitudinal axis 551. The longitudinal axis 541 and the longitudinal axis 55 forms a dogleg angle ($\theta_{dog}$) 560, and a transmitter-receiver pair line 534 lies between the point 550 and the point 540. The transmitter tilt plane normal vector 570 and the transmitter-receiver pair line 534 is corrected transmitter tilt angle ($\theta_t$) 572. The receiver tilt plane normal vector 574 and the transmitter-receiver pair line 534 forms a corrected receiver tilt angle ($\theta_r$) 578. The axis intersection point 511 is the point where the longitudinal axis 541 would intersect with the longitudinal axis 551.

Example Operations

Example operations are now described for processing of signals of a multi-sub resistivity tool to determine various formation characteristics (e.g., resistivity), formation boundaries, etc.

Figure 6:
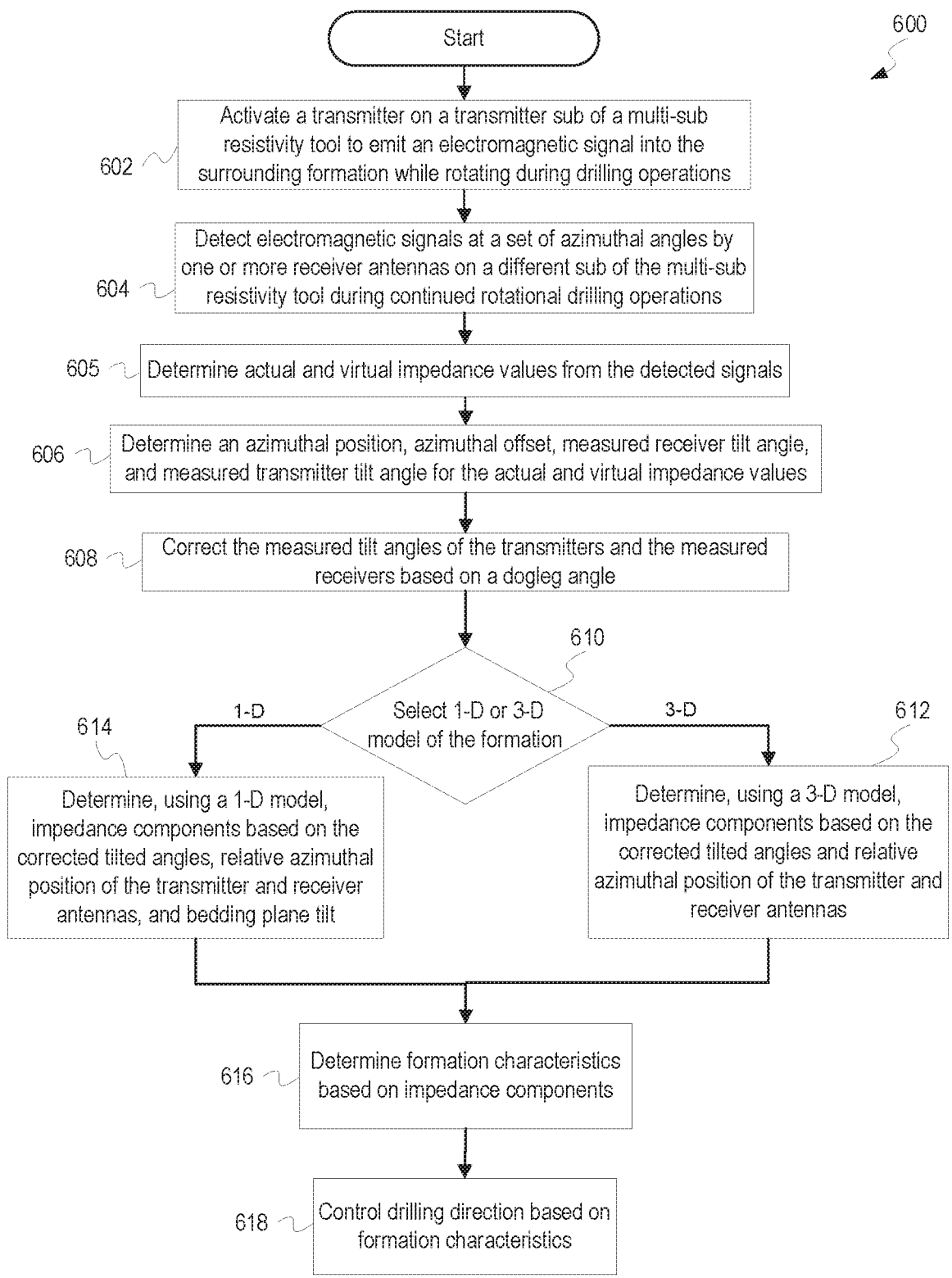
FIG. 6 depicts a flowchart of operations for using a multi-sub resistivity tool when a requisite number of measurements to evaluate a formation are detected by the multi-sub resistivity tool, according to some embodiments.

FIG. 6 depicts a flowchart of operations for using a multi-sub resistivity tool when a requisite number of measurements to evaluate a formation are detected by the multi-sub resistivity tool, according to some embodiments. The example operations are described with reference to the example multi-sub resistivity tools depicted in FIGS. 3-5. Operations of the flowchart 600 begin at block 602.

At block 602, a transmitter on a transmitter sub of a multi-sub resistivity tool is activated to emit an electromagnetic signal into the surrounding formation while rotating during drilling operations. For example, with reference to FIG. 3, the second tilted coil transmitter 346 can emit the electromagnetic signal at a specified frequency. With further reference to FIG. 3, each of the transmitters 342-348 can emit an electromagnetic signal at a different frequency, emit an electromagnetic signal at the same specified frequency, or emit no signal whatsoever, where each can act independently of the other transmitters.

At block 604, the electromagnetic signal emitted by one of the transmitters is detected at a set of azimuthal positions by one or more receivers on a different sub of the multi-sub resistivity tool during continued rotational drilling operations. For example, with reference to FIG. 3, the tilted coil receivers 354, 356, and 358 detects an electromagnetic signal sent by the second tilted coil transmitter 346 after the electromagnetic signal has traversed the surrounding formation. The first tilted receiver 354 can detect the electromagnetic signal as a voltage measurement, current measurement etc.

At block 605, actual and virtual impedance values $Z_r(\beta)$, can be determined from the detected values. For example, with reference to FIG. 3, actual $Z_r(\beta)$ values can be determined for an azimuthal position $\beta_i$ from the set of voltage measurements and the set of current measurements from each of the tilted coil receiver 354, 356, and 358 by dividing the measured voltages by their corresponding current measurements. By performing these calculations at each azimuthal position where the voltage measurements and current measurements are available, the impedance measurements at each of the azimuthal positions can be obtained. Virtual impedance values can be calculated for virtual coil receivers, wherein the virtual coil receivers are positioned between two real coils, and the virtual impedance values are based on the actual impedance values of the two real coils. By combining the actual impedance values and compensating for the tilt angles of the two real coils, these virtual impedance values can provide an approximation of the impedance values provided by an actual coil receiver that could be co-located with and at the same tilt angle as the virtual coil receiver, wherein co-located coils are coils with centers at approximately the same position. In this example, with reference to FIG. 3, the data from first tilted coil receiver 354 and data from third tilted coil receiver 358 can be combined to generate data of a virtual receiver co-located with the second tilted coil receiver 356 but at a different tilt angle.

At block 606, a receiver azimuthal position, an azimuthal offset, a measured receiver tilt angle, and a measured transmitter tilt angle are determined for the actual and virtual impedance values. For each actual and virtual impedance value detected or determined, the corresponding receiver azimuthal position, azimuthal offset, measured receiver tilt angle, and the measured transmitter tilt angle can be measured or determined. For example, with reference to FIG. 3 and FIG. 4, as the receiver sub 350 is rotated, the azimuthal position $\beta$ of the receiver sub 350, the azimuthal offset $\beta_{ref}$ between the transmitter sub 340 and receiver sub 350, the measured receiver tilt angle $\theta_{r-m}$ 378, and the measured transmitter tilt angle $\theta_{t-m}$ 372 can be determined for the actual or virtual impedance values in a rotation of the receiver sub 350. The value of $\beta_{ref}$ is based on the difference in the transmitter azimuthal position and the receiver azimuthal position and can be a result of their toolface offset. This determination can be made during the actual rotation and detection in block 604 and/or after the set of signals for a rotation have been detected.

At block 608, the measured receiver tilt angle and the measured transmitter tilt angle are corrected based on a dogleg angle. The dogleg angle between the axis of a receiver sub and the axis of a transmitter sub can be used to convert the measured values of $\theta_{r-m}$ and $\theta_{t-m}$ to the corrected receiver tilt angle $\theta_r$ and the corrected transmitter tilt angle $\theta_t$. In one example, the corrected transmitter tilt angle $\theta_t$ and the corrected receiver tilt angle $\theta_r$ can be determined by finding an axis intersection point. For example, with reference to FIG. 5, by measuring the length from the point 550 to the axis intersection point 511, the length from the point 540 to the axis intersection point 511, and the value of $\theta_{dog}$ 560, the other two angles of the triangle formed by the points 550, 540, and 511 can be determined. The values of $\theta_t$ and $\theta_r$ can then be determined from these two angles and the values of $\theta_{t-m}$ and $\theta_{r-m}$. Additional trigonometric relationships and simplifications for special geometric arrangements can be used to accelerate computation. As an illustrative example, with respect to FIG. 5, in the case where $\theta_{t-m}$ is 35 degrees, $\theta_{r-m}$ is 40 degrees, $\theta_{dog}$ 560 is 20 degrees, and a line segment between point 550 to the axis intersection point 511 has an equal length to a line segment between the point 540 and the axis intersection point 511, the corrected transmitter tilt angle $(\theta_t)$ 472 is 45 degrees and the corrected receiver tilt angle $(\theta_r)$ 478 is 30 degrees.

At block 610, a determination is made on whether to select a 1-D or three-dimensional (3-D) model of the formation. As described below, the selected model will be used to estimate a set of corrected impedance component values (component signals), wherein the 3-D model can provide more accurate results and also require more resources than a 1-D model. This determination can be made automatically or selected at the time of operation, and in either case can be made based on the desired level of prediction accuracy and precision balanced against available time or computing resources. If a 3-D operation is selected, operations of the flowchart 600 continue at block 612. Otherwise, operations of the flowchart 600 continue at block 614 (further described below).

At block 612, the impedance components are determined using a 3-D model based on the corrected tilted angles and relative azimuthal positions of the transmitter and receiver antennas. The data collected in block 606 or derived in block 608 can be used to determine the coupling components (i.e. $C_{xx}$, $C_{yx}$, $C_{zx}$, $C_{xy}$, $C_{yy}$, $C_{zy}$, $C_{xz}$, $C_{yz}$, and $C_{zz}$) and the impedance components ($Z_{xx}$, $Z_{yx}$, $Z_{zx}$, $Z_{xy}$, $Z_{yy}$, $Z_{zy}$, $Z_{xz}$, $Z_{yz}$, and $Z_{zz}$), wherein each of the subscripts x, y, and z denote orthogonal directions in a Cartesian coordinate system. The coupling components and impedance components are components of the coupling matrix C and the components of the impedance matrix Z, respectively. For example, $Z_{xx}$ indicates the impedance component opposing current flowing in the x-direction originating from the x-direction and $Z_{xz}$ indicates the impedance component facing in the x-direction originating from the z-direction. In this multi-sub system, the relationship between the coupling components and the impedance components can be represented as follows in Equation Set 1:

$$C_{xx}=Z_{xx}\sin\theta_t\sin\theta_r, C_{yx}=Z_{yx}\sin\theta_t\sin\theta_r, C_{zx}=Z_{zx}\cos\theta_t\sin\theta_r$$

$$C_{xy}=Z_{xy}\sin\theta_t\sin\theta_r, C_{yy}=Z_{yy}\sin\theta_t\sin\theta_r, C_{zy}=Z_{zy}\cos\theta_t\sin\theta_r$$

$$C_{xz}=Z_{xz}\sin\theta_t\sin\theta_r, C_{yz}=Z_{yz}\sin\theta_t\sin\theta_r, C_{zz}=Z_{zz}\cos\theta_t\sin\theta_r \quad (1)$$

At each azimuthal position $\beta$, the impedance value $Z_r(\beta)$ is known and thus can be associated with a relationship. In one example for a single azimuthal position β, the relationship can be represented as follows in Equation Set 2:

$$Z_r(\beta) = \left(\frac{C_{xx} - C_{yy}}{2}\right)\cos(2\beta + \beta_{ref}) + \left(\frac{C_{xy} + C_{yx}}{2}\right)\sin(2\beta + \beta_{ref})$$
$$+ (C_{zx}\cos\beta_{ref} + C_{zy}\sin\beta_{ref} + C_{xz})\cos\beta$$
$$+ (-C_{zx}\sin\beta_{ref} + C_{zy}\cos\beta_{ref} + C_{yz})\sin\beta + \left(\frac{C_{xx} + C_{yy}}{2}\right)\cos\beta_{ref}$$
$$+ \left(\frac{C_{xy} - C_{yx}}{2}\right)\sin\beta_{ref} + C_{zz}$$
(2)

The above relationship can be expressed as the following equation of a 3D multi-sub transmitter-receiver pair, with the local constants A', B' C', D', and E' substituting in for their respective coefficients above to form Equation 3, using the substitutions shown in Equation Set 4:

$$Z_R(\beta) = \gamma\cos(2\beta + \beta_{ref}) + \delta\sin(2\beta + \beta_{ref}) + \epsilon\cos\beta + \zeta\sin\beta + \eta \quad (3)$$

$$\gamma = \left(\frac{C_{xx} - C_{yy}}{2}\right) \quad (4)$$
$$\delta = \left(\frac{C_{xy} + C_{yx}}{2}\right)$$
$$\epsilon = (C_{zx}\cos\beta_{ref} + C_{zy}\sin\beta_{ref} + C_{xz})$$
$$\zeta = (-C_{zx}\sin\beta_{ref} + C_{zy}\cos\beta_{ref} + C_{yz})$$
$$\eta = \left(\frac{C_{xx} + C_{yy}}{2}\right)\cos\beta_{ref} + \left(\frac{C_{xy} - C_{yx}}{2}\right)\sin\beta_{ref} + C_{zz}$$

Equation 3 can be implemented for each value of β at every unique measurement point of both actual or virtual impedance measurements, wherein a measurement point is defined as a unique combination of values for $Z_R(\beta)$, $\beta_{ref}$, $\theta_r$, and $\theta_t$ at a given measured depth. Using Equation 3, a numeric system can be arranged to solve for the fitting coefficients α, δ, ε, ζ, and η. For example, in the case where 32 measurement points are available, the system can be arranged into Equation Set 5:

$$Z_R(\beta_1) = \gamma\cos(2\beta_1 + \beta_{ref}) + \delta\sin(2\beta_1 + \beta_{ref}) + \epsilon\cos\beta_1 + \zeta\sin\beta_1 + \eta$$
$$Z_R(\beta_2) = \gamma\cos(2\beta_2 + \beta_{ref}) + \delta\sin(2\beta_2 + \beta_{ref}) + \epsilon\cos\beta_2 + \zeta\sin\beta_2 + \eta$$
$$\vdots$$
$$Z_R(\beta_{32}) = \gamma\cos(2\beta_{32} + \beta_{ref}) + \delta\sin(2\beta_{32} + \beta_{ref}) + \epsilon\cos\beta_{32} + \zeta\sin\beta_{32} + \eta$$
(5)

In the above example, the system of 32 equations can be solved for the fitting coefficients α, δ, ε, ζ, and η by using various methods, such as creating a linear system and numerically solving for the unknown variables using the method of ordinary least squares and matrix decomposition. In the case of multiple co-located receivers, wherein the receivers can be either actual or virtual, a set of the fitting coefficients α, δ, ε, ζ, and η can be determined for each of the receivers.

Once these fitting coefficients α, δ, ε, ζ, and η are determined for one or more receivers, Equation Set 3 can be implemented to generate a second linear system and solved to determine the coupling components through analytical or numerical methods. The relationships shown in Equation Set 1 can be used to determine the impedance components based on the determined coupling components. In other embodiments, a change of orthogonal basis vectors can be performed, and the above formulations can utilize mathematical transforms to derive values of Z and C components in polar or cylindrical coordinates. Converting from these fitting coefficients to the impedance components can be considered as a form of decoupling component signals from the fitting coefficients.

At block 614, the impedance components are to be determined using a 3-D model based on the corrected tilted angles, relative azimuthal positions of the transmitter and receiver antennas, and the bedding plane tilt. The 1-D model assumes that formation layers only vary with respect to one dimension, allowing the elimination of a dimension from the 3-D model. In one example, the y-direction is chosen to be the eliminated dimension. Thus, the multi-dimensional components $Z_{xy}$, $Z_{yx}$, $Z_{yz}$, $Z_{zy}$, and values proportional to those multi-dimensional components can be set to zero. In addition to the previously provided parameters from block 602 and block 604, a 1-D model can be further enhanced by providing a known bedding plane tilt angle $\theta_{bed}$. For example, with respect to FIG. 3, the bedding plane tilt angle ($\theta_{bed}$) 315 would be used in this approximation. The following relationship between the receiver response and the system parameters can then be expressed as the following in Equation 6, wherein the fitting coefficients are defined in Equation Set 7:

$$Z_R(\beta) = \gamma\cos(2\beta' + \beta_{ref}) + \lambda\cos\beta + \xi\sin\beta + Y \quad (6)$$

$$\beta' = \beta - \beta_{bed} \quad (7)$$
$$\gamma = \frac{(C_{xx} - C_{yy})}{2}$$
$$\lambda = C_{zx}\cos\beta_{ref} + C_{xz}$$
$$\xi = -C_{zx}\sin\beta_{ref}$$
$$Y = C_{zz} + (C_{xx} + C_{yy})\cos\frac{\beta_{ref}}{2}$$

An alternative expression of the above relationship can form the following in Equation 8 of a 1-D multi-sub transmitter-receiver pair, wherein the coefficients are defined as follows in Equation Set 9:

$$Z_R(\beta) = \gamma\cos(2\beta' + \beta_{ref}) + \Gamma\cos(\beta' + \beta'') + D \quad (8)$$

$$C = C_{zz} + (C_{xx} + C_{yy})\cos\frac{\beta_{ref}}{2} \quad (9)$$
$$\Gamma' = \sqrt{(C_{zx}\cos\beta_{ref} + C_{xz})^2 + (C_{zx}\sin\beta_{ref})^2}$$
$$\gamma = \frac{(C_{xx} - C_{yy})}{2} = \frac{(V_{xx} - V_{yy})\sin\theta_t\sin\theta_r}{2}$$
$$\beta'' = \arctan\left(\frac{-C_{zx}\sin\beta_{ref}}{C_{zx}\cos\beta_{ref} + C_{xz}}\right)$$
$$\beta' = \beta - \beta_{bed}$$
$$C = \Gamma'\sin\beta''$$
$$\Gamma = \Gamma'\cos\beta''$$

Thus, using equation (6) using equation set (7) and/or equation (8) using equation set (9) for each value of $Z_R(\beta)$ at different values of β in one rotation of a receiver allows the determination of the impedance components. Similar to block 612, converting from fitting coefficients to the impedance components can be considered as a form of decoupling component signals from the fitting coefficients.

At block 616, the impedance components can be used to determine formation characteristics. In one example, the impedance components can be used with a forward-modeling method to determine resistivity, which can be further used to determine the location of different formation layers and formation boundaries. In another example, impedance components can be used to estimate subsurface qualities such as hydrocarbon quantity, rock types, and porosity. In another example, the operation can use pattern-matching on the processed data to estimate the boundaries of the formation.

At block 618, the formation characteristics can be used to control drilling operations. For instance, the direction of a drill bit can be altered to move in the direction of a hydrocarbon-bearing formation when the formation characteristics indicate that the wellbore is not within such a formation. In another example, the drill bit is to be operated to avoid the boundary of a hydrocarbon-bearing formation when the formation characteristics indicate that the drill bit is within such a formation.

Figure 7:
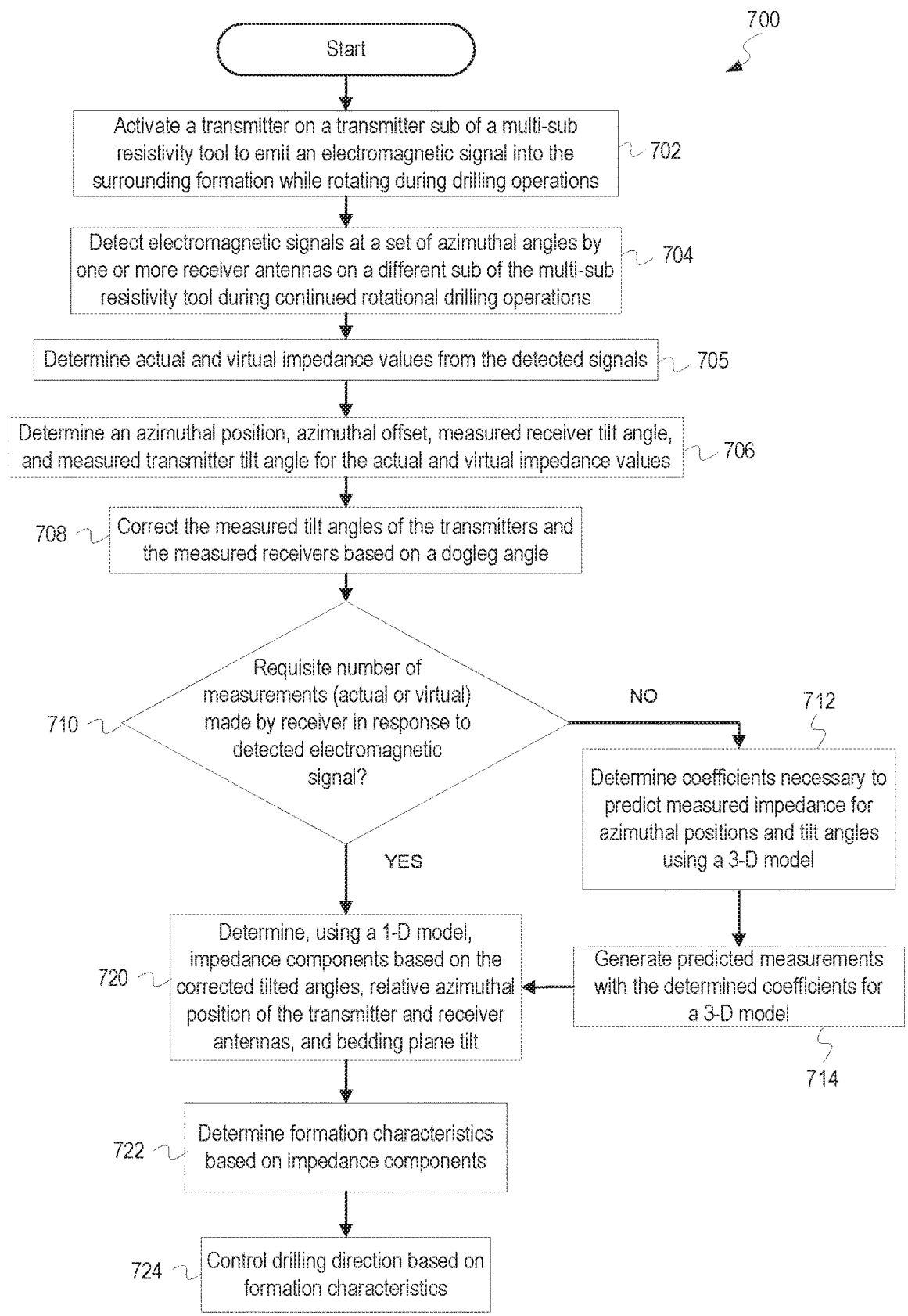
FIG. 7 depicts a flowchart of operations for using a multi-sub resistivity tool when a requisite number of measurements to evaluate a formation are not detected by the multi-sub resistivity tool, according to some embodiments.

FIG. 7 depicts a flowchart of operations for using a multi-sub resistivity tool when a requisite number of measurements to evaluate a formation are not detected by the multi-sub resistivity tool, according to some embodiments. The example operations are described with reference to the example multi-sub resistivity tools depicted in FIGS. 3-5. Operations of flowchart 700 begin at block 702.

At block 702, a transmitter on a transmitter sub of a multi-sub resistivity tool is activated to emit an electromagnetic signal into the surrounding formation while rotating during drilling operations. For example, with reference to FIG. 3, the second tilted coil transmitter 346 can emit the electromagnetic signal at a specified frequency. With further reference to FIG. 3, each of the transmitters 342-348 can emit an electromagnetic signal at a different frequency, emit an electromagnetic signal at the same specified frequency, or emit no signal whatsoever, where each can act independently of the other transmitters.

At block 704, the electromagnetic signal emitted by one of the transmitters is detected at a set of azimuthal positions by one or more receivers on a different sub of the multi-sub resistivity tool during continued rotational drilling operations. For example, with reference to FIG. 3, the tilted coil receivers 354, 356, and 358 detects an electromagnetic signal sent by the second tilted coil transmitter 346 after the electromagnetic signal has traversed the surrounding formation. The tilted coil receivers 354, 356, and 358 can detect the electromagnetic signal as a voltage measurement, current measurement etc.

At block 705, actual and virtual impedance values $Z_r(\beta)$, can be determined from the detected values. For example, with reference to FIG. 3, actual $Z_r(\beta)$ values can be determined for an azimuthal position $\beta_i$ from the set of voltage measurements and the set of current measurements from each of the tilted coil receiver 354, 356, and 358 by dividing the measured voltages by their corresponding current measurements. By performing these calculations at each azimuthal position where the voltage measurements and current measurements are available, the impedance measurements at each of the azimuthal positions can be obtained. Virtual impedance values can be calculated for virtual coil receivers. For instance, a virtual coil receiver can be positioned between two actual coil receivers. For example, a virtual coil receiver can be co-located with the second tilted coil receiver 356 and positioned between the tilted coil receiver 354 and the tilted coil receiver 358. Co-located coil receivers can be receivers having centers at approximately the same position. In some embodiments, this virtual coil receiver can be tilted at an angle approximately 90 degrees relative to the angle of the tilted coil receiver 356. A virtual coil receiver can have a virtual impedance value that is based on the actual impedance values of the two actual coil receivers between which the virtual coil receiver is located. By combining the actual impedance values and compensating for the tilt angles of the two actual coil receivers, these virtual impedance values can provide an approximation of the impedance values provided by an actual coil receiver that could be co-located with and at the same tilt angle as the virtual coil receiver. Accordingly, in this example, the data from first tilted coil receiver 354 and data from third tilted coil receiver 358 can be combined to generate an impedance value of a virtual receiver co-located with the second tilted coil receiver 356 but at a different tilt angle.

At block 706, a receiver azimuthal position, an azimuthal offset, a measured receiver tilt angle, and a measured transmitter tilt angle are determined for the actual and virtual impedance values. For each actual and virtual impedance value detected or determined, the corresponding receiver azimuthal position, azimuthal offset, measured receiver tilt angle, and measured transmitter tilt angle can be measured or determined. For example, with reference to FIG. 3 and FIG. 4, as the receiver sub 350 is rotated, the azimuthal position $\beta$ of the receiver sub 350, the azimuthal offset $\beta_{ref}$ between the transmitter sub 340 and receiver sub 350, the measured receiver tilt angle $\theta_{r-m}$ 378, and the measured transmitter tilt angle $\theta_{t-m}$ 372 can be determined for the actual or virtual impedance values in a rotation of the receiver sub 350. The value of $\beta_{ref}$ is based on the difference in the transmitter azimuthal position and the receiver azimuthal position and can be a result of their toolface offset. This determination can be made during the actual rotation and detection in block 704 and/or after the set of signals for a rotation has been detected.

At block 708, the measured receiver tilt angle and the measured transmitter tilt angle are corrected based on a dogleg angle. The dogleg angle between the axis of a receiver sub and the axis of a transmitter sub can be used to convert the measured values of $\theta_{r-m}$ and $\theta_{t-m}$ to the corrected receiver tilt angle $\theta_r$ and the corrected transmitter tilt angle $\theta_t$. In one example, the corrected transmitter tilt angle $\theta_t$ and the corrected receiver tilt angle $\theta_r$ can be determined by finding an axis intersection point. In general, basic trigonometric principles can be applied to determine the values of $\theta_t$ and $\theta_r$.

At block 710, a determination is made of whether a requisite number of measurements (actual or virtual) were made by each receiver in response to the detected electromagnetic signal. As described above, the receiver can make an actual measurement at different azimuthal positions during rotation, in response to the detected electromagnetic signal. Alternatively, a virtual measurement can be made based on two actual measurements at an azimuthal position between the azimuthal positions associated with the two actual measurements. Therefore, the determination can be whether the initial total number of measurements is equal to or greater than the requisite number of measurements, wherein the initial total number of measurements comprises actual measurements and virtual measurements. The initial total number of measurements for a receiver can depend on factors such as drilling speed, soft rocks, abnormal formations, etc. The requisite number of measurements can depend on factors such as the required range of accuracy, precision, data processing time, etc. As the requisite number of measurements increases, the precision and accuracy of the measurements increases and the data processing time also increases.

In one embodiment, each actual receiver or virtual receiver can have the same requisite number of measurements. In another embodiment, each actual receiver or virtual receiver can have different requisite numbers of measurements. For example, with respect to FIG. 3, the initial total number of measurements for the second tilted coil receiver 356 can be compared with a first requisite number of measurements and the initial total number of measurements for a virtual coil receiver co-located with the second tilted coil receiver 356 can be compared with a second requisite number of measurements. In one embodiment, the first requisite number of measurements and second requisite number of measurements can both equal 32. In another embodiment, the first requisite number of measurements can equal 32 while the second requisite number of measurements can equal 16.

If the requisite number of measurements is not made, predicted measurements are generated and added to the initial total number of measurements made by receivers that did not make a requisite number of measurements, and operations of the flowchart 700 continue at block 712. Otherwise, if the requisite number of measurements is made by each receiver, operations of the flowchart 700 continue at block 720.

At block 712, coefficients (necessary to predict measured impedance at azimuthal positions and tilt angles where the receiver was unable to make actual or virtual measurements) are determined using a 3-D model. The coefficients can be determined using the following: 1) the actual and virtual impedance values from the detected signals (see description of block 705 above) and 2) the receiver azimuthal position, the azimuthal offset, and the measured receiver and transmitter tilt angles for the actual and virtual impedance values (see description of block 706 above).

The actual and virtual impedance values from the detected signals, the receiver azimuthal position, the azimuthal offset, the measured receiver tilt angles, and the measure transmitter tilt angles are to be used in a relationship to determine the impedance components and receiver voltage C. As long as the initial total number of available $Z_r(\beta)$ measurements is equal to or greater than the number of local constants to be determined, a system of equations can be arranged to solve for the local constants. When using a 3D multi-sub transmitter-receiver pair as a model, Equation 2 is a valid pattern to use to estimate the fitting coefficients. Equation 2 shows be five local coefficients which would define the relationship between tilt angles, azimuthal position, and $Z_r(\beta)$: $\gamma$, $\delta$, $\epsilon$, $\zeta$, and $\eta$. Using the pattern shown in Equation 2, at least five unique values of $Z_r(\beta)$ would be necessary to estimate the coefficients at block 706. For example, if 10 measurement points were available, the system of equations shown in Equation Set 10 can be used to solve for the local coefficients:

$$Z_R(\beta_1) = \gamma\cos(2\beta_1 + \beta_{ref}) + \delta\sin(2\beta_1 + \beta_{ref}) + \epsilon\cos\beta_1 + \zeta\sin\beta_1 + \eta$$
$$Z_R(\beta_2) = \gamma\cos(2\beta_2 + \beta_{ref}) + \delta\sin(2\beta_2 + \beta_{ref}) + \epsilon\cos\beta_2 + \zeta\sin\beta_2 + \eta$$
$$\vdots$$
$$Z_R(\beta_{10}) = \gamma\cos(2\beta_{10} + \beta_{ref}) + \delta\sin(2\beta_{10} + \beta_{ref}) + \epsilon\cos\beta_{10} + \zeta\sin\beta_{10} + \eta$$

(10)

At block 714, the coefficients determined in block 712 are used to generate the predicted measurements using a 3-D model. In this example, Equation 2 can be used in conjunction with the coefficients $\gamma$, $\delta$, $\epsilon$, $\zeta$, and $\eta$ to generate predicted measurements for different values of $Z_r(\beta)$ until the total measurement count is equal to the requisite number of measurements, wherein the total measurement count is the sum of the number of the actual measurements, virtual measurements and predicted measurements for each receiver. In some embodiments, the act of generating these predicted measurements can be a form of reproducing electromagnetic signals for the operation. For example, with respect to FIG. 3, the second tilted coil receiver 356 and a virtual coil receiver co-located with the second tilted coil receiver 356 can each have a set of coefficients $\gamma$, $\delta$, $\epsilon$, $\zeta$, and $\eta$ calculated, wherein each set of coefficients can be used to generate predicted measurements for different values of $Z_r(\beta)$.

At block 720, a 1-D model is used to determine impedance components based on the corrected tilted angles, relative azimuthal position of the transmitter and receiver antennas, and bedding plane tilt. In one example, the same 3D equation used in block 706 can be used in block 720. In another example, a 1-D approximation equation can be used instead. The equation of a 1-D multi-sub transmitter-receiver pair can be used to set up a system of equations using the available or generated $Z_r(\beta)$ values. In one example, the following system can be arranged and solved using the 1-D model, wherein $\beta'$ and $\beta''$ represent the same values as described above, and the subscripts denotes the respective measurement point of the given azimuthal position, as shown below in Equation Set 11:

$$Z_R(\beta_1) = \gamma\cos(2\beta'_1 + \beta_{ref}) + \Gamma\cos(\beta'_1 + \beta''_1) + D$$
$$Z_R(\beta_2) = \gamma\cos(2\beta'_2 + \beta_{ref}) + \Gamma\cos(\beta'_2 + \beta''_2) + D$$
$$\vdots$$
$$Z_R(\beta_{32}) = A\cos(2\beta'_{32} + \beta_{ref}) + B'\cos(\beta'_{32} + \beta''_{32}) + D$$

(11)

At block 722, the impedance components can be used to determine formation characteristics. In one example, the impedance components can be used with a forward-modeling method to determine resistivity, which can be further used to determine the location of different formation layers and formation boundaries. In another example, impedance components can be used to estimate subsurface qualities such as hydrocarbon quantity, rock types, and porosity. In another example, the operation can use pattern-matching on the processed data to estimate the boundaries of the formation.

At block 724, the formation characteristics can be used to control drilling operations. For instance, the direction of a drill bit can be altered to move in the direction of a hydrocarbon-bearing formation when the formation characteristics indicate that the wellbore is not within such a formation. In another example, the drill bit is to be operated to avoid the boundary of a hydrocarbon-bearing formation when the formation characteristics indicate that the drill bit is within such a formation.

The flowcharts are provided to aid in understanding the illustrations and are not to be used to limit scope of the claims. The flowcharts depict example operations that can vary within the scope of the claims. Additional operations can be performed, fewer operations can be performed; the operations can be performed in parallel; and the operations can be performed in a different order. For example, the operations depicted in blocks 604-610 and 612 can be performed in parallel or concurrently. With respect to FIG. 6, at block 616, formation characteristics can instead be determined from other values measured by the antennas, and it would be understood that derived resistivity values can also be acquired from other values measurable by a receiver antenna. It will be understood that each block of the flowchart illustrations and/or block diagrams, and combinations of blocks in the flowchart illustrations and/or block diagrams, can be implemented by program code. The program code can be provided to a processor of a general-purpose computer, special purpose computer, or other programmable machine or apparatus.

Example Results

The following are example results of the operations disclosed above. As will be further elaborated upon, such results can be used to monitor and control drilling operations to ensure maximum hydrocarbon recovery.

Figure 8:
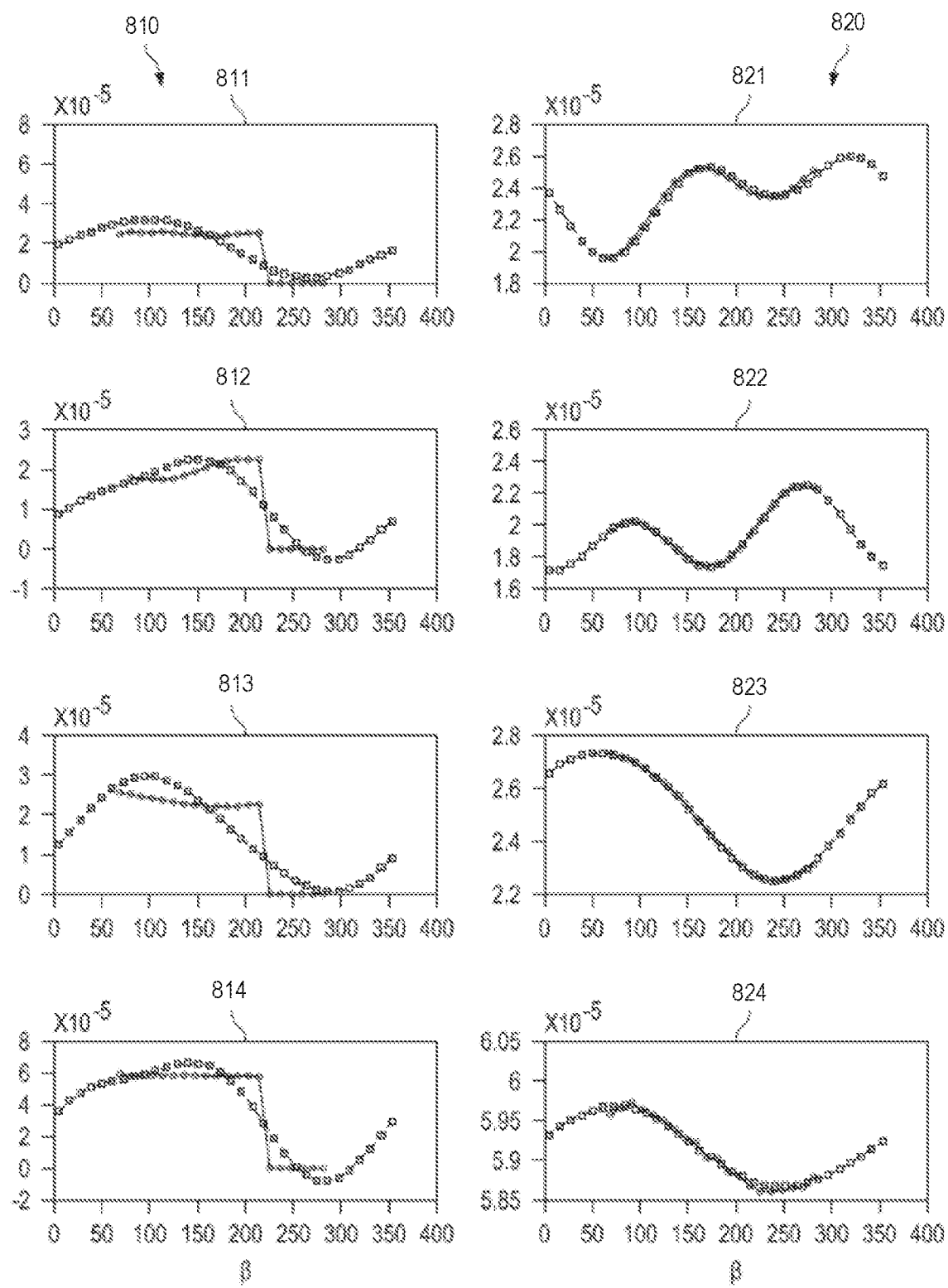
FIG. 8 depicts plots that demonstrate the effects of using operations depicted in the flowchart of FIG. 7, according to some embodiments.

FIG. 8 depicts plots that demonstrate the effects of using operations depicted in the flowchart of FIG. 7, according to some embodiments. Each of the plots shown comprises a set of points and lines representing the measured data and a set of points and lines representing curve-fitting of the measured data, which can include electromagnetic signals. The measured data is represented by the circular markers and is tracked by the dashed line. The curve-fitting is represented by the square markers and the dashed lines.

Column 810 comprises of plots 811-814, wherein the x-axis of each of the plots 811-814 shows the set of azimuthal positions $\beta$, ranging from 0 degrees to 360 degrees. The y-axis of plots 811 and 812 are the real components of measured impedance from a receiver antenna. The y-axis of plots 813 and 814 are the imaginary components of measured impedance, with the Ohms as the unit of measurement. As shown in the plots 811-814, impedance data as shown by the circular markers is available only until $\beta$ is equal to 225 degrees. Beyond this value, no measured impedance data is available, resulting in a discontinuity that reduces the accuracy of predictions from any of the curve-fitting lines shown in the plots 811-814.

Column 820 comprises plots 821-824, wherein each plot comprises of a processed data line and a fitted data line after applying the advanced fitting workflow previously described on the plots in column 810. Specifically, the x-axis of each of the plots 821-824 shows the set of azimuthal positions $\beta$, which ranges from 0 degrees to 360 degrees. The y-axis of plots 821 and 822 are the real components of measured impedance from a receiver antenna with the Ohms as the unit of measurement. The y-axis of plots 823 and 824 are the imaginary components of measured impedance.

Before fitting the processed data, corrective operations (described above in FIG. 7) are used to solve for missing $Z_R(\beta)$ values. Using the data shown in example, with further reference to FIG. 7, the operation will begin at block 702 and proceed through each of block 704-706, until reaching block 710. At block 710, it will be recognized that the number of measured measurement points is less than a minimum and the operation will proceed to block 712. At block 712, the available number of 20 measurement points will be arranged into the pattern shown in Equation 2 and be used to form the relationships shown in Equation Set 5, creating a set of 20 relationships as represented in Equation Set 12:

$$Z_R(\beta_1) = \gamma\cos(2\beta_1 + \beta_{ref}) + \delta\sin(2\beta_1 + \beta_{ref}) + \epsilon\cos\beta_1 + \zeta\sin\beta_1 + \eta$$
$$Z_R(\beta_2) = \gamma\cos(2\beta_2 + \beta_{ref}) + \delta\sin(2\beta_2 + \beta_{ref}) + \epsilon\cos\beta_2 + \zeta\sin\beta_2 + \eta$$
$$\vdots$$
$$Z_R(\beta_{20}) = \gamma\cos(2\beta_{20} + \beta_{ref}) + \delta\sin(2\beta_{20} + \beta_{ref}) + \epsilon\cos\beta_{20} + \zeta\sin\beta_{20} + \eta$$

(12)

Because each of the $\beta$, $\beta_{ref}$, and $Z_R(\beta)$ shown above are known, the coefficients $\gamma$, $\delta$, $\epsilon$, $\zeta$, and $\eta$ for the system of equations shown in Equation Set 12 data and used in Equation 2 can be numerically estimated. These coefficients can then be substituted into Equation 2 to create an approximate function for $Z_R(\beta)$ as a function of $\beta$ and generate, at unique and unmeasured values of $\beta$, new values of $Z_R(\beta)$ until the minimum number of measurement points has been reached. For example, with reference to FIG. 7, after numerically estimating the coefficients $\gamma$, $\delta$, $\epsilon$, $\zeta$, and $\eta$ at block 712, the operation will proceed to block 714 and substitute the coefficients $\gamma$, $\delta$, $\epsilon$, $\zeta$, and $\eta$ to Equation 2 to generate the other measurement points until 32 measurement points are available for fitting, resulting in the far more accurate fitting shown by the dashed line of plot 821.

This same operation can be observed for each of the plots 722-724, wherein the measured data shown by the circular markers is used to generate additional measurement points before the combined set of measured and generated data are curve-fitted, wherein the results of curve-fitting are shown by the square markers and tracked by the dashed line.

Figure 9:
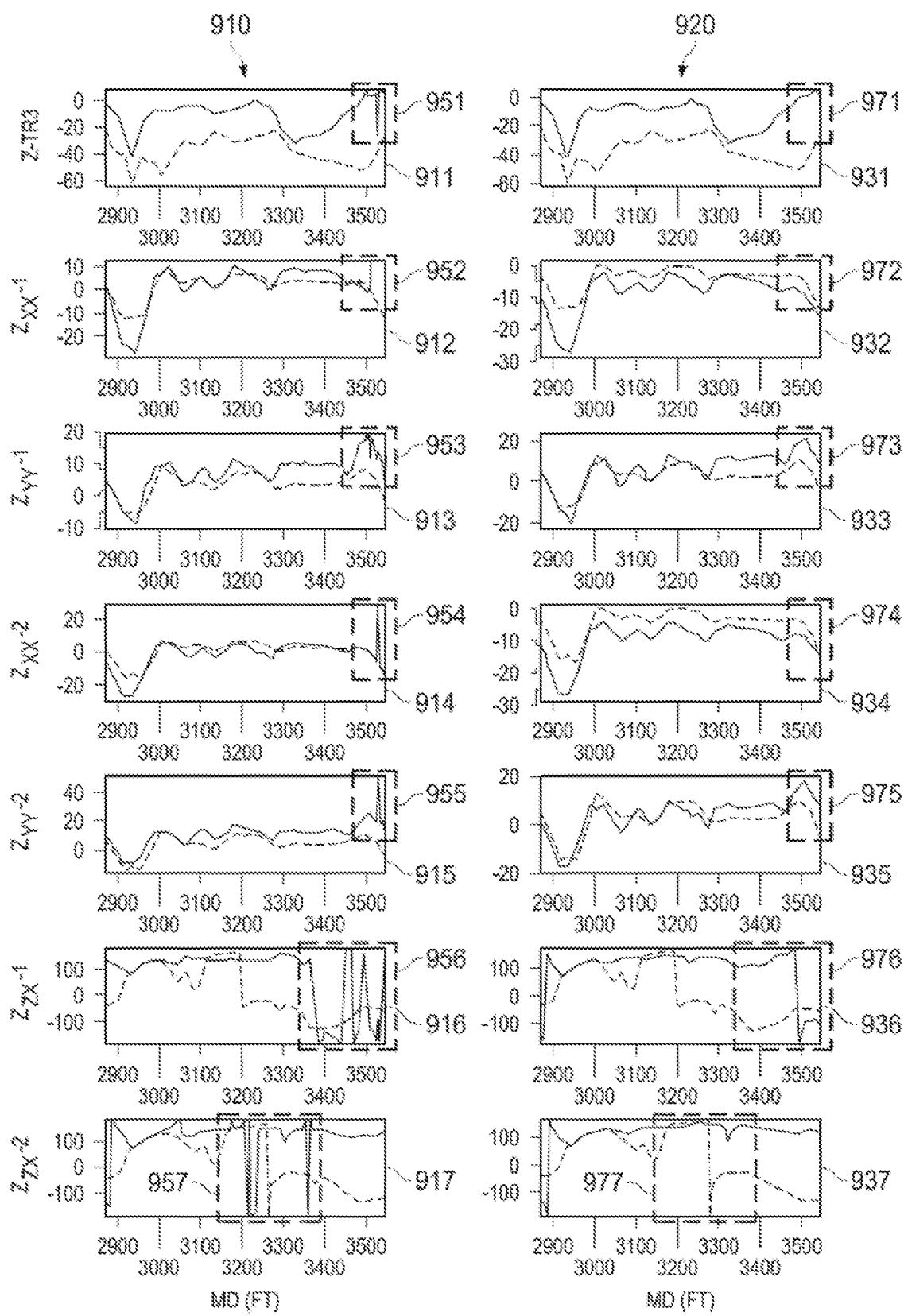
FIG. 9 depicts data showing the effects of using operations depicted in the flowcharts of FIGS. 6-7 to reduce or eliminate sudden spikes or dips in data, according to some embodiments.

FIG. 9 depicts data showing the effects of using operations depicted in the flowcharts of FIGS. 6-7 to reduce or eliminate sudden spikes or dips in data, according to some embodiments. Each of the plots 911-917 and 931-937 has a y-axis representing a impedance component an x-axis representing the measured depth (MD) in feet. The y-axis of plot 911 and plot 931 shows the phase shift of a transmitter-receiver relationship. The y-axis of plot 912 and plot 932 shows the $Z_{xx}$ component estimated during data processing in a first receiver. The y-axis of plot 913 and plot 933 shows the $Z_{yy}$ component estimated during data processing in a second receiver. The y-axis of plot 914 and plot 934 shows the $Z_{xx}$ component estimated during data processing in a second receiver. The v-axis of plot 915 and plot 935 shows the $Z_{yy}$ component estimated during data processing in a second receiver. The y-axis of plot 916 and plot 936 shows the $Z_{zx}$ component estimated during data processing in a first receiver. The y-axis of plot 917 and plot 937 shows the $Z_{zx}$ component estimated during data processing in a second receiver.

Each of the plots in column 910 shows a data spike or dip in the processed signal without the use of the advanced fitting algorithm, as outlined in the boxed regions 951-957. With respect to FIG. 6, these spikes or dips are based on the processing the measured $Z_R(\beta)$ data described in blocks 602-616 when the number of measurement points do not meet a minimum value. For example, plot 911 shows that the number of measured measurement points is lower than the minimum at approximately 3530 ft. While the $Z_R(\beta)$ of the measurement points are not directly shown on this plot, the effects of having fewer measurement points than a minimum number can be directly seen in the dip in the boxed region 951.

Each of the plots in column 930 show the same data spike removed from the system by application of the advanced processing methods described herein, as circled in regions 971-977. For example, with reference to FIG. 7, the data spikes shown in 951 can be removed when block 710 is reached and the operation determines that the requisite number of measurements is made by the receiver. The operation can then proceed to block 712 and 714 to calculate a set of predicted measurements so that the total measurement count is equal to or greater than the requisite number of measurements. While these generated values are not directly depicted in FIG. 9, the boxed region 971 shows that using these generated values in conjunction with the measured impedance values can remove the data spikes or dips that result from an insufficient number of measurements.

Example Drilling System

Figure 10:
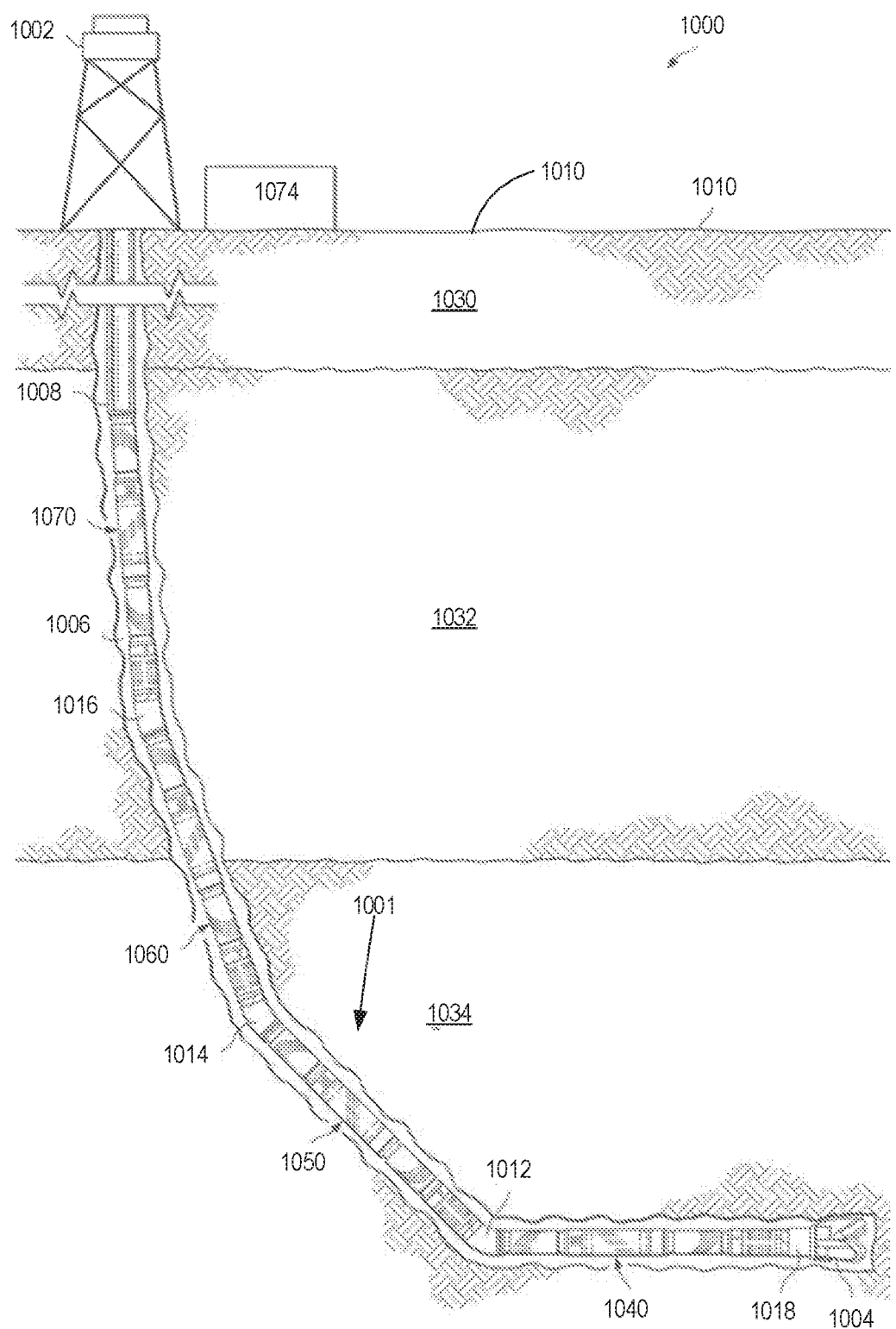
FIG. 10 depicts an example drilling system, according to some embodiments.

FIG. 10 depicts an example drilling system, according to some embodiments. FIG. 10 depicts a drilling rig system 1000 can include the various examples of a multi-sub resistivity tool described herein. For example, the multi-sub resistivity tool can be part of the BHA to emit and detect electromagnetic signals during rotational drilling operations (e.g., during a LWD operation).

The drilling rig system 1000 includes a drilling rig 1002 located at the surface 1010 of a borehole 1006. The drilling rig 1002 can provide support for a drill string 1008 that includes a BHA. The drill string 1008 can be operated for drilling the borehole 1006 through the subsurface formations 1030 with the BHA.

The BHA includes the multi-sub resistivity tool comprised of a reference transmitter sub 940, a third receiving sub 1050, a second receiving sub 1060, and a first receiving sub 1070. The BHA can include another downhole tool 1018 and a drill bit 1004. The drill bit 1004 can operate to create the borehole 1006 by penetrating the surface 1010 and the subsurface formations 1030, 1032, and 1034. The downhole tool 1018 can comprise any of a number of different types of tools including pipe characterization tools, MWD tools, LWD tools, and others. In some examples, fiber optic cable can be spliced, rerouted, coupled, guided, or otherwise modified to maintain connections at each drill collar and at each position along the drill string 1008. In some examples, a fiber optic connector can be provided at each drill collar or other joint or position downhole.

During drilling operations, the drill string 1008 can be rotated by a rotary table. In addition to, or alternatively, a motor (e.g., a mud motor) that is located downhole can rotate the BHA. Drill collars can be used to add weight to the drill bit 1004. The drill collars can also operate to stiffen the BHA, allowing the BHA to transfer the added weight to the drill bit 1004, and in turn, to assist the drill bit 1004 in penetrating the surface 1010 and subsurface formations 1030, 1032, and 1034.

In this example, part of drilling the borehole 1006 includes directional drilling such that the borehole 1006 curves off vertical (as shown). The first receiving sub 1070 is positioned at the upper portion of the drill string 1008. A first connecting tool 1016 is connected below the first receiving sub 1070. The second receiving sub 1060 is connected below the first connecting tool 1016. The first connecting tool 1016 can help enforce space between the first receiving sub 1070 from the second receiving sub 1060 as well as provide the curvature necessary to allow the multi-sub resistivity tool to follow the curved path of the borehole 1006. A second connecting tool 1014 is connected below the second receiving sub 1060. The third receiving sub 1050 is connected below the second connecting tool 1014. A third connecting tool 1012 is connected below the second the third receiving sub 1050. The reference transmitter sub 1040 is connected below the third connecting tool 1012. The drill bit 1004 is connected below the reference transmitter sub 1040. In some embodiments, the direction of the drill bit 1004 can be changed to maximize hydrocarbon recovery based on results of processing of signals from the multi-sub resistivity tool (as described herein). For example, direction of the drill bit 1004 can be altered to cause the borehole 1006 to go into or remain in a formation that is identified as having hydrocarbons based on resistivity values determined by processing of signals from the multi-sub resistivity tool.

During drilling operations, a mud pump can pump drilling fluid (sometimes known by those of ordinary skill in the art as "drilling mud") from a mud pit through a hose into the drill string 1008 and down to the drill bit 1004. The drilling fluid can flow out from the drill bit 1004 and be returned to the surface 1010 through an annular area between the drill string 1008 and the sides of the borehole 1006. The drilling fluid can then be returned to the mud pit, where such fluid is filtered. In some examples, the drilling fluid can be used to cool the drill bit 1004, as well as to provide lubrication for the drill bit 1004 during drilling operations. Additionally, the drilling fluid can be used to remove subsurface formation cuttings created by operating the drill bit 1004.

Thus, for the purposes of this document, the term "housing" when used to address tools below the surface (e.g., downhole), can include any one or more of a drill collar or a downhole tool (all having an outer wall, to enclose or attach to magnetometers, sensors, fluid sampling devices, pressure measurement devices, transmitters, receivers, acquisition and processing logic, and data acquisition systems).

Thus, a drilling rig system 1000 can comprise a downhole tool body, such as a multi-sub resistivity tool 1001, and/or a downhole tool 1018 (e.g., an LWD or MWD tool body), and fiber optic cable to provide signaling to a surface system 1074.

Example Wireline System

Figure 11:
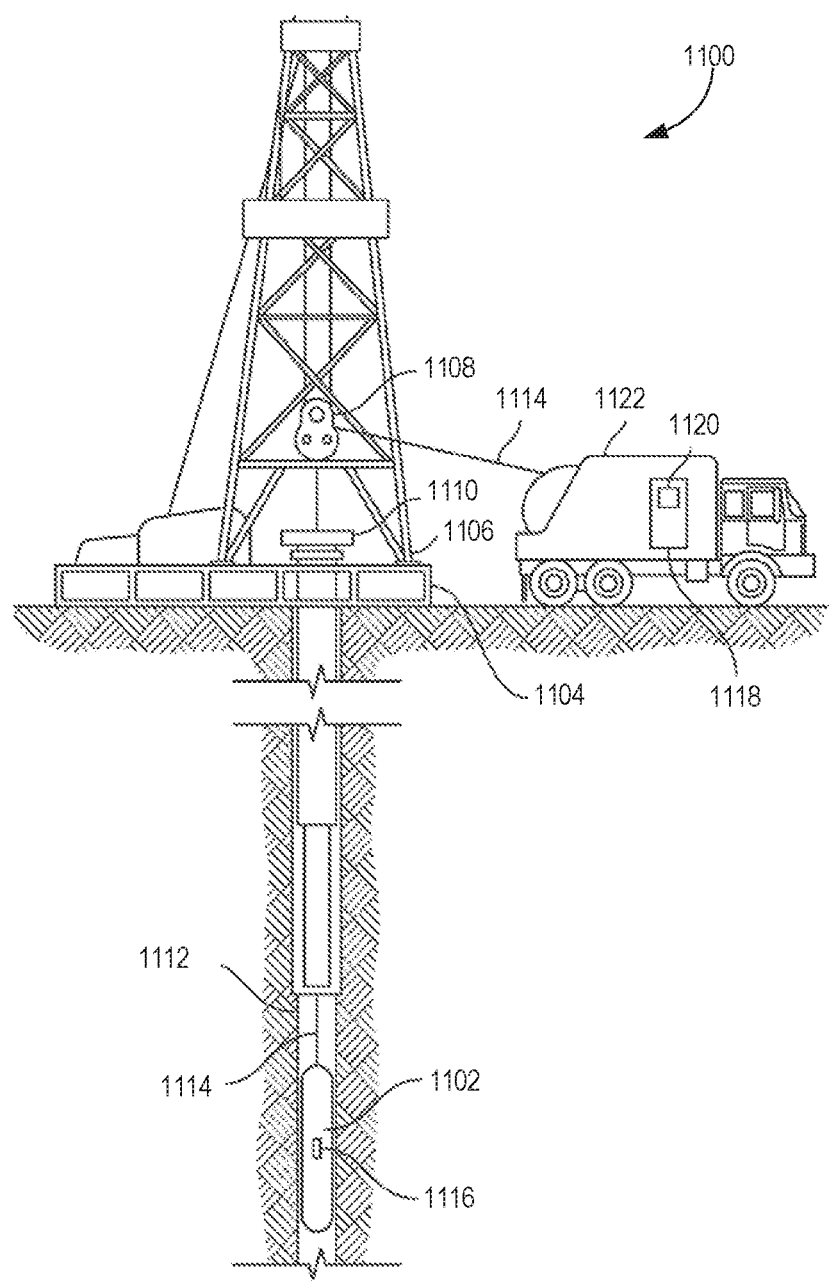
FIG. 11 depicts an example wireline system, according to some embodiments.

In some embodiments, the multi-sub rotational resistivity logging tool can be incorporated into other downhole systems such as wireline or slickline systems. To illustrate, FIG. 11 depicts an example wireline system, according to some embodiments. The wireline system 1100 can comprise portions of a wireline logging tool body 1102 as part of a wireline logging operation. Thus, FIG. 11 shows a well during wireline logging operations. In this case, a drilling platform 1104 is equipped with a derrick 1106 that supports a hoist 1108.

Drilling oil and gas wells is commonly carried out using a string of drill pipes connected together so as to form a drilling string that is lowered through a rotary table 1110 into a wellbore or borehole 1112. Here it is assumed that the drilling string has been temporarily removed from the borehole 1112 to allow a wireline logging tool body 1102, such as a probe or sonde, to be lowered by wireline or logging cable 1114 into the borehole 1112. Typically, the wireline logging tool body 1102 is lowered to the bottom of the region of interest and subsequently pulled upward at a substantially constant speed. The tool 1105 can be disposed in the borehole 1106 by a number of different arrangements such as, but not limited to, in a wireline arrangement, a slickline arrangement, a logging-while-drilling (LWD) arrangement or other conveyance arrangement such as coiled tubing, drill pipe, downhole tractor, or the like.

During the upward trip, at a series of depths instruments 1116 (e.g., pipe characterization tools such as eddy current (EC) tools described later herein) included in the wireline logging tool body 1102 can be used to perform measurements on pipes as well as other measurements subsurface geological formations adjacent the borehole 1112 (and the wireline logging tool body 1102). The measurement data can be communicated to a surface system 1118 for storage, processing, and analysis. The surface system 1118 can be provided with electronic equipment for various types of signal processing. Similar formation evaluation data can be gathered and analyzed during drilling operations (e.g., during LWD operations, and by extension, sampling while drilling).

The wireline logging tool body 1102 is suspended in the wellbore by a wireline cable 1114 that connects the tool to the surface system 1118 (which can also include a display 1120). In some embodiments, the wireline logging tool body 1102 can include a multi-sub rotational resistivity logging tool. Alternatively, the wireline logging tool body 1102 can be attached to the multi-sub rotational resistivity logging tool. This wireline cable 1114 can include (or perform functionalities of) a fiber optic cable. The tool can be deployed in the borehole 1112 on coiled tubing, jointed drill pipe, hard-wired drill pipe, or any other suitable deployment technique. In embodiments, the fiber optic cable can include sensors for characterize the pipe containing the optical cable and adjacent pipes over time.

Example Computer Device

Figure 12:
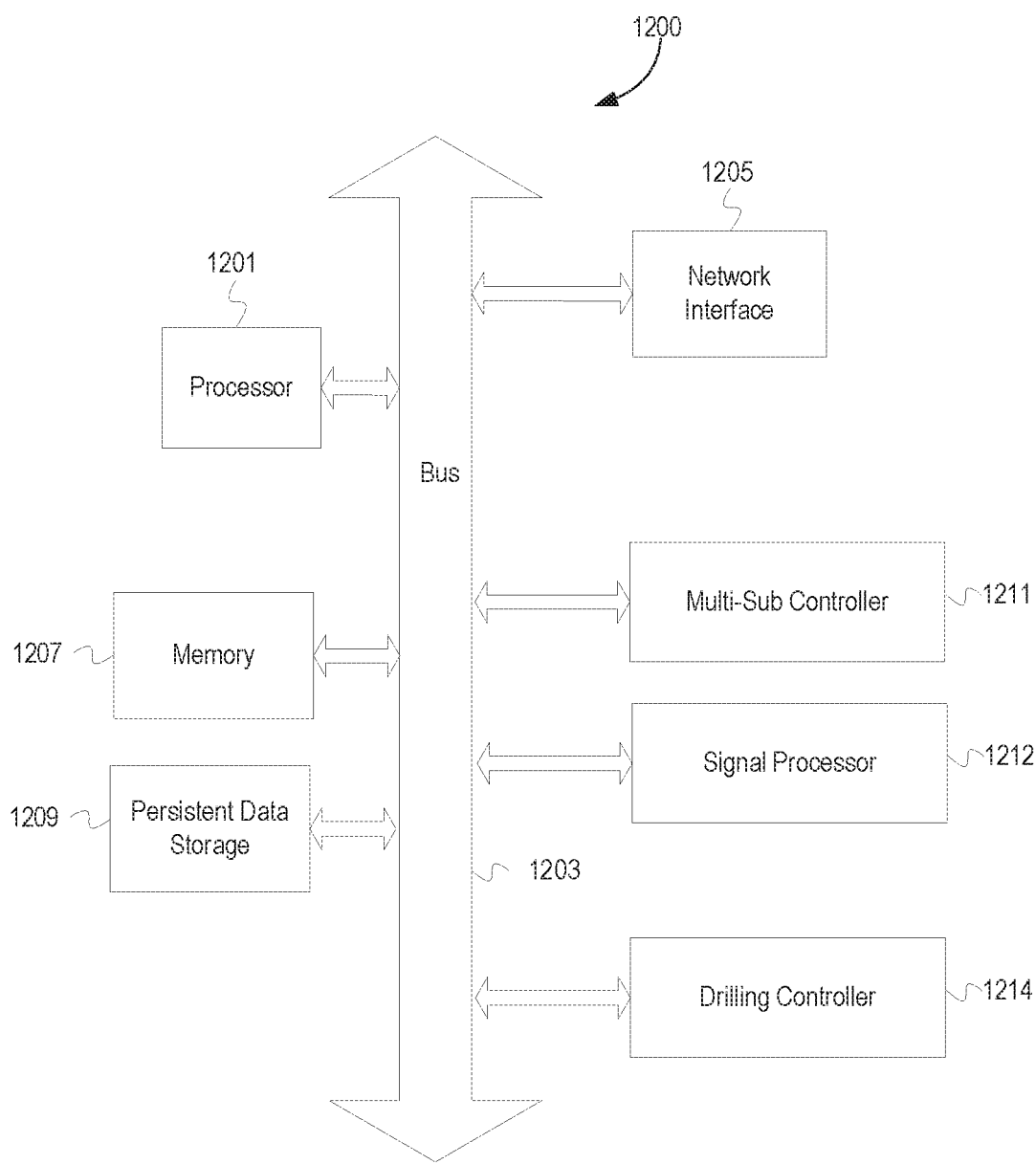
FIG. 12 depicts an example computer device, according to some embodiments.

FIG. 12 depicts an example computer device, according to some embodiments. A computer device 1200 includes a processor 1201 (possibly including multiple processors, multiple cores, multiple nodes, and/or implementing multi-threading, etc.). The computer device 1200 includes a memory 1207. The memory 1207 can be system memory (e.g., one or more of cache, SRAM. DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1200 also includes a bus 1203 (e.g., PCI. ISA, PCI-Express. HyperTransport® bus, InfiniBand® bus, NuBus, etc.) and a network interface 1205 (e.g., a Fiber Channel interface, an Ethernet interface, an internet small computer system interface, SONET interface, wireless interface, etc.).

In some embodiments, the computer device 1200 can perform signal processing of the electromagnetic signals emitted and detected by a multi-sub resistivity tool. Additionally, the computer device can be used to control the multi-sub resistivity tool and drilling operations based on the signal processing. For example, the computer device 1200 includes a multi-sub controller 1211, a signal processor 1212, and a drilling controller 1214. The multi-sub controller 1211 can perform one or more operations for controlling a multi-sub resistivity tool. The signal processor 1212 can process the signals emitted and detected by a multi-sub resistivity tool. The drilling controller 1214 can control the drilling operations based on the signals processed from the multi-sub resistivity tool. Any one of the previously described functionalities can be partially (or entirely) implemented in hardware and/or on the processor 1201. For example, the functionality can be implemented with an application specific integrated circuit, in logic implemented in the processor 1201, in a co-processor on a peripheral device or card, etc. Further, realizations can include fewer or additional components not illustrated in FIG. 12 (e.g., video cards, audio cards, additional network interfaces, peripheral devices, etc.). The processor 1201 and the network interface 1205 are coupled to the bus 1203. Although illustrated as being coupled to the bus 1203, the memory 1207 can be coupled to the processor 1201. The computer device 1200 can be integrated into component(s) of the drill string downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language: and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Variations

Plural instances can be provided for components, operations or structures described herein as a single instance. Finally, boundaries between various components, operations and data stores are somewhat arbitrary, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B. and C" can be infringed with only one of the listed items, multiple of the listed items, and one or more of the items in the list and another item not listed.

Example Embodiments

Example embodiments include the following:

Embodiment 1

A method comprising: determining a resistivity of a formation, based on a detection of angular electromagnetic signals by a receiver antenna on a first sub of a multi-sub resistivity tool during rotational operation in a wellbore within the formation, the angular electromagnetic signals emitted into the formation, prior to the detection, by a transmitter antenna on a second sub of the multi-sub resistivity tool, wherein the first sub and the second sub are separated apart such that the angular electromagnetic signals are to be transmitted deep into the formation, wherein determining the resistivity comprises, curve-fitting and reproducing angular electromagnetic signals by the receiver antenna; and decoupling component signals based on fitting coefficients derived from the angular electromagnetic signals.

Embodiment 2

The method of Embodiment 1, wherein curve fitting the angular electromagnetic signals comprises curve fitting based on a position of the transmitter antenna and a position of the receiver antenna, at a time of the detection, and wherein the first sub has a first sub axis and the second sub has a second sub axis, and wherein the transmitter antenna has a first azimuthal angle and the receiver antenna has a second azimuthal angle, and wherein the transmitter antenna has a first dip angle and the receiver antenna has a second dip angle.

Embodiment 3

The method of Embodiments 1 or 2, wherein curve-fitting and reproducing angular electromagnetic signals comprises: generating a plurality of measurements that are based, at least in part, on the angular electromagnetic signals, wherein each of the plurality of measurements comprises an impedance measurement; determining whether an initial total number of the plurality of measurements is less than a requisite number of measurements; and in response to the initial total number of the plurality of measurements being less than the requisite number of measurements, generating a plurality of predicted measurements based on the plurality of measurements, such that the initial total number of the plurality of measurements and the plurality of predicted measurements are equal to or greater than the requisite number of measurements.

Embodiment 4

The method of any of Embodiments 1-3, wherein generating the plurality of predicted measurements comprises: determining a plurality of coefficients for a model of the formation based on the plurality of measurements; and generating each of the plurality of predicted measurements at an angular position based on the plurality of coefficients for the model of the formation, wherein the angular position for each of the plurality of predicted measurements is unique relative to each other and angular positions of each of the measurements.

Embodiment 5

The method of any of Embodiments 1-4, further comprising determining a formation boundary based on the resistivity of the formation.

Embodiment 6

The method of any of Embodiments 1-5, further comprising modifying drilling of the wellbore based on the resistivity of the formation and the formation boundary.

Embodiment 7

The method of any of Embodiments 1-6, wherein the first sub has a first sub axis and the second sub has a second sub axis, and wherein the first sub axis and the second sub axis are nonparallel during the detection.

Embodiment 8

The method of any of Embodiments 1-7, wherein the first sub has a first sub axis and the second sub has a second sub axis, and wherein an angle formed by the first sub axis and second sub axis varies as the multi-sub resistivity tool is lowered down the wellbore.

Embodiment 9

One or more non-transitory machine-readable media comprising program code, the program code to: determine a resistivity of a formation, based on a detection of angular electromagnetic signals by a receiver antenna on a first sub of a multi-sub resistivity tool during rotational operation in a wellbore within the formation, the angular electromagnetic signals emitted into the formation, prior to the detection, by a transmitter antenna on a second sub of the multi-sub resistivity tool, wherein the first sub and the second sub are separated apart such that the angular electromagnetic signals are to be transmitted deep into the formation, and wherein the program code to determine the resistivity comprises program code to, curve-fit and reproduce the angular electromagnetic signals by the receiver antenna; and decouple component signals based on fitting coefficients derived from the angular electromagnetic signals.

Embodiment 10

The one or more non-transitory machine-readable media of Embodiment 9, wherein the program code to curve-fit angular electromagnetic signals comprises program code to curve-fit the angular electromagnetic signals based on a position of the transmitter antenna and a position of the receiver antenna, at a time of the detection, wherein the first sub has a first sub axis and the second sub has a second sub axis, and wherein the transmitter antenna has a first azimuthal angle and the receiver antenna has a second azimuthal angle, and wherein the transmitter antenna has a first dip angle and the receiver antenna has a second dip angle.

Embodiment 11

The one or more non-transitory machine-readable media of Embodiments 9 or 10, wherein the program code to curve-fit and reproduce the angular electromagnetic signals comprises program code to: generate a plurality of measurements that are based, at least in part, on the angular electromagnetic signals, wherein each of the plurality of measurements comprises an impedance measurement; determine whether an initial total number of the plurality of measurements is less than a requisite number of measurements: and in response to the initial total number of the plurality of measurements being less than the requisite number of measurements, generate a plurality of predicted measurements based on the plurality of measurements, such that the initial total number of the plurality of measurements and the plurality of predicted measurements are equal to or greater than the requisite number of measurements.

Embodiment 12

The one or more non-transitory machine-readable media of any of Embodiments 9-1, wherein the program code to generate the plurality of predicted measurements comprises program code to: determine a plurality of coefficients for a model of the formation based on the plurality of measurements; and generate each of the plurality of predicted measurements at an angular position based on the plurality of coefficients for the model of the formation, wherein the angular position for each of the plurality of predicted measurements is unique relative to each other and angular positions of each of the measurements.

Embodiment 13

The one or more non-transitory machine-readable media of any of Embodiments 9-12, wherein the program code comprises program code to: determine a formation boundary based on the resistivity of the formation.

Embodiment 14

The one or more non-transitory machine-readable media of any of Embodiments 9-13, wherein the program code comprises program code to: modify drilling of the wellbore based on the resistivity of the formation and the formation boundary.

Embodiment 15

The one or more non-transitory machine-readable media of any of Embodiments 9-14, wherein the first sub has a first sub axis and the second sub has a second sub axis, and wherein the first sub axis and the second sub axis are nonparallel during the detection. [0118]1 Embodiment 16: The one or more non-transitory machine-readable media of any of Embodiments 9-15, wherein the first sub has a first sub axis and the second sub has a second sub axis, and wherein an angle formed by the first sub axis and second sub axis varies as the multi-sub resistivity tool is lowered down the wellbore.

Embodiment 17

A system comprising: a multi-sub tool comprising, a transmitter sub having a transmitter antenna and a transmitter sub axis, wherein the transmitter antenna is to emit angular electromagnetic signals into a formation within a wellbore; and a receiver sub having a receiver antenna and a receiver sub axis, wherein the receiver antenna is to detect the angular electromagnetic signals after traversal into the formation: a processor; and a machine-readable medium having program code executable by the processor to cause the processor to, determine a resistivity of the formation, based on detecting and fitting of the angular electromagnetic signals and based on positions of transmitter antenna and receiver antenna during the detection.

Embodiment 18

The system of Embodiment 17, wherein the program code executable by the processor to cause the processor to: determine, at a time of the detection, a position of the transmitter antenna and a position of the receiver antenna, wherein the position of the transmitter antenna comprises the transmitter sub axis, a dip angle and an azimuthal angle, and wherein the program code executable by the processor to cause the processor to determine the resistivity comprises program code executable by the processor to curve fitting angular electromagnetic signals based on the position of the transmitter antenna and the position of the receiver antenna.

Embodiment 19

The system of Embodiments 17 or 18, wherein the program code executable by the processor to cause the processor to fit the angular electromagnetic signals comprises program code executable by the processor to cause the processor to: generate a plurality of measurements that are based, at least in part, on the angular electromagnetic signals, wherein each of the plurality of measurements comprises an impedance measurement; determine whether an initial total number of the plurality of measurements is less than a requisite number of measurements; and in response to the initial total number of the plurality of measurements being less than the requisite number of measurements, generate a plurality of predicted measurements based on the plurality of measurements, such that the initial total number of the plurality of measurements and the plurality of predicted measurements are equal to or greater than the requisite number of measurements, wherein the program code executable by the processor to cause the processor to generate the plurality of predicted measurements comprises program code executable by the processor to cause the processor to: determine a plurality of coefficients for a model of the formation based on the plurality of measurements: and generate each of the plurality of predicted measurements at an angular position based on the plurality of coefficients for the model of the formation, wherein the angular position for each of the plurality of predicted measurements is unique relative to each other and angular positions of each of the measurements.

Embodiment 20

The system of any of Embodiments 17-19, wherein the program code executable by the processor to cause the processor to: determine a formation boundary based on the resistivity of the formation; and modify drilling of the wellbore based on the resistivity of the formation and the formation boundary.

What is claimed is:

1. A method comprising:
   determining a resistivity of a formation, based on a detection of angular electromagnetic signals by a receiver antenna on a first sub of a multi-sub resistivity tool during rotational operation in a wellbore within the formation, the angular electromagnetic signals emitted into the formation, prior to the detection, by a transmitter antenna on a second sub of the multi-sub resistivity tool,
   wherein the first sub and the second sub are separated apart such that the angular electromagnetic signals are to be transmitted deep into the formation,
   wherein determining the resistivity comprises,
      curve-fitting and reproducing angular electromagnetic signals by the receiver antenna; and
      decoupling component signals based on fitting coefficients derived from the angular electromagnetic signals.

2. The method of claim 1,
   wherein curve-fitting the angular electromagnetic signals comprises curve-fitting based on a position of the transmitter antenna and a position of the receiver antenna, at a time of the detection, and
   wherein the first sub has a first sub axis and the second sub has a second sub axis, and
   wherein the transmitter antenna has a first azimuthal angle and the receiver antenna has a second azimuthal angle, and wherein the transmitter antenna has a first dip angle and the receiver antenna has a second dip angle.

3. The method of claim 1, wherein curve-fitting and reproducing angular electromagnetic signals comprises:
   generating a plurality of measurements that are based, at least in part, on the angular electromagnetic signals, wherein each of the plurality of measurements comprises an impedance measurement;
   determining whether an initial total number of the plurality of measurements is less than a requisite number of measurements; and
   in response to the initial total number of the plurality of measurements being less than the requisite number of measurements, generating a plurality of predicted measurements based on the plurality of measurements, such that the initial total number of the plurality of measurements and the plurality of predicted measurements are equal to or greater than the requisite number of measurements.

4. The method of claim 3, wherein generating the plurality of predicted measurements comprises:
   determining a plurality of coefficients for a model of the formation based on the plurality of measurements; and
   generating each of the plurality of predicted measurements at an angular position based on the plurality of coefficients for the model of the formation, wherein the angular position for each of the plurality of predicted measurements is unique relative to each other and angular positions of each of the measurements.

5. The method of claim 1, further comprising determining a formation boundary based on the resistivity of the formation.

6. The method of claim 5, further comprising modifying drilling of the wellbore based on the resistivity of the formation and the formation boundary.

7. The method of claim 1, wherein the first sub has a first sub axis and the second sub has a second sub axis, and wherein the first sub axis and the second sub axis are nonparallel during the detection.

8. The method of claim 1, wherein the first sub has a first sub axis and the second sub has a second sub axis, and wherein an angle formed by the first sub axis and second sub axis varies as the multi-sub resistivity tool is lowered down the wellbore.

9. One or more non-transitory machine-readable media comprising program code, the program code to:
   determine a resistivity of a formation, based on a detection of angular electromagnetic signals by a receiver antenna on a first sub of a multi-sub resistivity tool during rotational operation in a wellbore within the formation, the angular electromagnetic signals emitted into the formation, prior to the detection, by a transmitter antenna on a second sub of the multi-sub resistivity tool,
   wherein the first sub and the second sub are separated apart such that the angular electromagnetic signals are to be transmitted deep into the formation,
   and wherein the program code to determine the resistivity comprises program code to,
      curve-fit and reproduce the angular electromagnetic signals by the receiver antenna; and
      decouple component signals based on fitting coefficients derived from the angular electromagnetic signals.

10. The one or more non-transitory machine-readable media of claim 9,
    wherein the program code to curve-fit angular electromagnetic signals comprises program code to curve-fit the angular electromagnetic signals based on a position of the transmitter antenna and a position of the receiver antenna, at a time of the detection,
    wherein the first sub has a first sub axis and the second sub has a second sub axis,
    and wherein the transmitter antenna has a first azimuthal angle and the receiver antenna has a second azimuthal angle, and wherein the transmitter antenna has a first dip angle and the receiver antenna has a second dip angle.

11. The one or more non-transitory machine-readable media of claim 9, wherein the program code to curve-fit and reproduce the angular electromagnetic signals comprises program code to:
    generate a plurality of measurements that are based, at least in part, on the angular electromagnetic signals, wherein each of the plurality of measurements comprises an impedance measurement;
    determine whether an initial total number of the plurality of measurements is less than a requisite number of measurements; and in response to the initial total number of the plurality of measurements being less than the requisite number of measurements, generate a plurality of predicted measurements based on the plurality of measurements, such that the initial total number of the plurality of measurements and the plurality of predicted measurements are equal to or greater than the requisite number of measurements.

12. The one or more non-transitory machine-readable media of claim 11, wherein the program code to generate the plurality of predicted measurements comprises program code to:
determine a plurality of coefficients for a model of the formation based on the plurality of measurements; and
generate each of the plurality of predicted measurements at an angular position based on the plurality of coefficients for the model of the formation, wherein the angular position for each of the plurality of predicted measurements is unique relative to each other and angular positions of each of the measurements.

13. The one or more non-transitory machine-readable media of claim 9, wherein the program code comprises program code to:
determine a formation boundary based on the resistivity of the formation.

14. The one or more non-transitory machine-readable media of claim 13, wherein the program code comprises program code to:
modify drilling of the wellbore based on the resistivity of the formation and the formation boundary.

15. The one or more non-transitory machine-readable media of claim 9, wherein the first sub has a first sub axis and the second sub has a second sub axis, and wherein the first sub axis and the second sub axis are nonparallel during the detection.

16. The one or more non-transitory machine-readable media of claim 9, wherein the first sub has a first sub axis and the second sub has a second sub axis, and wherein an angle formed by the first sub axis and second sub axis varies as the multi-sub resistivity tool is lowered down the wellbore.

17. A system comprising:
a multi-sub tool comprising,
a transmitter sub having a transmitter antenna and a transmitter sub axis, wherein the transmitter antenna is to emit angular electromagnetic signals into a formation within a wellbore; and
a receiver sub having a receiver antenna and a receiver sub axis, wherein the receiver antenna is to detect the angular electromagnetic signals after traversal into the formation;
a processor; and
a non-transitory machine-readable medium having program code executable by the processor to cause the processor to,
determine a resistivity of the formation, based on detecting and fitting of the angular electromagnetic signals and based on positions of transmitter antenna and receiver antenna during the detection.

18. The system of claim 17, wherein the program code executable by the processor to cause the processor to:
determine, at a time of the detection, a position of the transmitter antenna and a position of the receiver antenna,
wherein the position of the transmitter antenna comprises the transmitter sub axis, a dip angle and an azimuthal angle,
and wherein the program code executable by the processor to cause the processor to determine the resistivity comprises program code executable by the processor to curve fitting angular electromagnetic signals based on the position of the transmitter antenna and the position of the receiver antenna.

19. The system of claim 17, wherein the program code executable by the processor to cause the processor to fit the angular electromagnetic signals comprises program code executable by the processor to cause the processor to:
generate a plurality of measurements that are based, at least in part, on the angular electromagnetic signals, wherein each of the plurality of measurements comprises an impedance measurement;
determine whether an initial total number of the plurality of measurements is less than a requisite number of measurements; and
in response to the initial total number of the plurality of measurements being less than the requisite number of measurements, generate a plurality of predicted measurements based on the plurality of measurements, such that the initial total number of the plurality of measurements and the plurality of predicted measurements are equal to or greater than the requisite number of measurements,
wherein the program code executable by the processor to cause the processor to generate the plurality of predicted measurements comprises program code executable by the processor to cause the processor to:
determine a plurality of coefficients for a model of the formation based on the plurality of measurements; and
generate each of the plurality of predicted measurements at an angular position based on the plurality of coefficients for the model of the formation, wherein the angular position for each of the plurality of predicted measurements is unique relative to each other and angular positions of each of the measurements.

20. The system of claim 17, wherein the program code executable by the processor to cause the processor to:
determine a formation boundary based on the resistivity of the formation; and
modify drilling of the wellbore based on the resistivity of the formation and the formation boundary.

\* \* \* \* \*